United States Patent [19]
Koza et al.

[11] Patent Number: 5,148,513
[45] Date of Patent: Sep. 15, 1992

[54] NON-LINEAR GENETIC PROCESS FOR USE WITH PLURAL CO-EVOLVING POPULATIONS

[75] Inventors: John R. Koza, 25372 La Rena La., Los Altos Hills, Calif. 94022; James P. Rice, Redwood City, Calif.

[73] Assignee: John R. Koza, Los Altos Hills, Calif.

[21] Appl. No.: 584,259

[22] Filed: Sep. 18, 1990

Related U.S. Application Data

[63] Continuation-in-part of Ser. No. 500,791, Mar. 28, 1990, abandoned, which is a continuation-in-part of Ser. No. 196,973, May 20, 1988, Pat. No. 4,935,877.

[51] Int. Cl.$^5$ .......................................... G06F 15/00
[52] U.S. Cl. ..................................................... 395/13
[58] Field of Search ........................... 364/513; 395/13

[56] References Cited

U.S. PATENT DOCUMENTS

| | | | |
|---|---|---|---|
| 4,479,241 | 10/1984 | Buckley | 364/513 |
| 4,675,829 | 6/1987 | Clemenson | 364/513 |
| 4,697,242 | 9/1987 | Holland et al. | 364/513 |
| 4,821,333 | 4/1989 | Gillies | 382/41 |

*Primary Examiner*—Allen R. MacDonald
*Attorney, Agent, or Firm*—Blakely, Sokoloff, Taylor & Zafman

[57] ABSTRACT

A non-linear genetic process for problem solving using co-evolving populations of entities is disclosed. The iterative process of the present invention operates on a plurality of populations of problem solving entities. First, an activated entity in one of the plurality of populations (evolving population) performs, producing a result. The result is assigned a value and the value is associated with the producing entity. The value assigned is computed relative to the performance of the entity in a population different from the evolving population (one of the environmental populations). Next, entities having relatively high associated values are selected from the evolving population. The selected entities perform either crossover or fitness proportionate reproduction. In addition, other operations such as mutation, permutation, define building blocks and editing may be used. Next, the newly created entities are added to the evolving population. Finally, one of the environmental populations switch roles with the evolving population and the process repeats for the new evolving population and the new environmental populations.

45 Claims, 13 Drawing Sheets

Parent 1

$(-(+(+B1\ B2)\ A11)(*\ B2\ A12))$

400

Parent 2

$(-(*\ B1\ A22)(-\ B2\ A11))$

420

Offspring 1

$(-(+(+B1\ B2)\ A11)(-\ B2\ A11))$

440

Offspring 2

$(-(*\ B1\ A22)(*\ B2\ A12))$ 470   460

Game Tree with Payoffs

NON-LINEAR GENETIC PROCESS FOR USE WITH PLURAL CO-EVOLVING POPULATIONS

This application is a continuation-in-part patent application of co-pending U.S. patent application Ser. No. 07/500,791; filed Mar. 28, 1990 now abandoned; titled *Non-Linear Genetic Algorithms For Solving Problems By Finding a Fit Composition Of Functions*; which is a continuation-in-part of U.S. patent application Ser. No. 07/196973 now U.S. Pat. No. 4,935,877; filed May 20, 1988; and titled *Non-Linear Genetic Algorithms For Solving Problems*.

BACKGROUND OF THE INVENTION

1. The Field of the Invention

The field of the invention is that of genetic processes. More specifically, the field is that of non-linear genetic processes using co-evolving populations suitable for solving problems.

2. The Prior Art

The Natural Selection Process in Nature

The natural selection process provides a powerful tool for problem solving. This is shown by nature and its various examples of biological entities that survive and evolve in various environments. In nature, complex combinations of traits give particular biological populations the ability to adapt, survive, and reproduce in their environments. Equally impressive is the complex, relatively rapid, and robust adaptation and relatively good interim performance that occurs amongst a population of individuals in nature in response to changes in the environment. Nature's methods for adapting biological populations to their environment and nature's method of adapting these populations to successive changes in their environments (including survival and reproduction of the fittest) provides a useful model. This model can develop methods to solve a wide variety of complex problems which are generally thought to require "intelligence" to solve.

In nature, a gene is the basic functional unit by which hereditary information is passed from parents to offspring. Genes appear at particular places (called gene "loci") along molecules of deoxyribose nucleic acid (DNA). DNA is a long thread-like biological molecule that has the ability to carry hereditary information and the ability to serve as a model for the production of replicas of itself. All known life forms on this planet (including bacteria, fungi, plants, animals, and human) are based on the DNA molecule.

The so-called "genetic code" involving the DNA molecule consists of long strings (sequences) of 4 possible gene values that can appear at the various gene loci along the DNA molecule. For DNA, the 4 possible gene values refer to 4 "bases" named adenine, guanine, cytosine, and thymine (usually abbreviated as A, G, C, and T, respectively). Thus, the "genetic code" in DNA consists of a long strings such as CTCGACGGT . . .

A chromosome consists of numerous gene loci with a specific gene value (called an "allele") at each gene locus. The chromosome set for a human being consists of 23 pairs of chromosomes. The chromosomes together provide the information necessary to describe one individual human being and contain about 3,000,000,000 genes. These 3,000,000,000 genes constitute the so-called "genome" for one particular human being. Complete genomes of the approximately 5,000,000,000 living human beings together constitute the entire pool of genetic information for the human species. It is known that certain gene values occurring at certain places in certain chromosomes control certain traits of the individual, including traits such as eye color, susceptibility to particular diseases, etc.

When living cells reproduce, the genetic code in DNA is read. Subsequences consisting of 3 DNA bases are used to specify one of 20 amino acids. Large biological protein molecules are, in turn, made up of anywhere between 50 and 500 such amino acids. Thus, this genetic code is used to specify and control the building of new living cells from amino acids.

The organisms consisting of the living cells created in this manner spend their lives attempting to deal with their environment. Some organisms do better than others in grappling with (or opposing) their environment. In particular, some organisms survive to the age of reproduction and therefore pass on their genetic make-up (chromosome string) to their offspring. In nature, the process of Darwinian natural selection causes organisms with traits that facilitate survival to the age of reproduction to pass on all or part of their genetic make-up to offspring. Over a period of time and many generations, the population as a whole evolves so that the chromosome strings in the individuals in the surviving population perpetuate traits that contribute to survival of the organism in its environment.

Prior Art Genetic Algorithms

Genetic algorithms are highly parallel algorithms that transform populations of individual mathematical objects (typically fixed-length binary character strings) into new populations using operations patterned after (1) natural genetic operations such as sexual recombination (crossover) and (2) fitness proportionate reproduction (Darwinian survival of the fittest). Genetic algorithms begin with an initial population of individuals (typically randomly generated) and then iteratively (1) evaluate the individuals in the population for fitness with respect to the problem environment and (2) perform genetic operations on various individuals in the population to produce a new population. John Holland of the University of Michigan presented the pioneering formulation of genetic algorithms for fixed-length binary character strings in *Adaptation in Artificial and Natural Systems*, by Professor John H. Holland, 1975. Holland established, among other things, that the genetic algorithm is a mathematically near optimal (minimax) approach to adaptation in that it maximizes expected overall average payoff when the adaptive process is viewed as a multiarmed slot machine problem requiring an optimal allocation of future trials given currently available information. Recent work in genetic algorithms and genetic classifier systems can be surveyed in Grefenstette (1985), Grefenstette (1987), Goldberg (1989), Davis (1987), and Schaffer (1989).

In *Adaptation in Artificial and Natural Systems*, Holland summarizes his research in genetic algorithms and presents an overall mathematical theory of adaptation for both natural and artificial systems. A key part of this book described a "genetic algorithm" patterned after nature's methods for biological adaptation. However, a limitation of this work resides in using fixed length binary strings to represent the population. U.S. Pat. No. 4,697,242 (Holland) and U.S. Pat. No. 4,881,178 (Holland) are examples of processes which use fixed length binary strings with a genetic algorithm.

Empirical studies by various researchers have demonstrated the capabilities of such genetic algorithms in many diverse areas, including function optimization (De Jong 1980), operation of a gas pipeline (Goldberg 1983), and many others reviewed in Goldberg (1989).

In the chapter entitled "An Overview" contained in the 1987 collection *Genetic Algorithms and Simulated Annealing*, Lawrence Davis and Martha Steenstrup stated, "In all of Holland's work, and in the work of many of his students, chromosomes are bit strings—lists of 0's and 1's." In addition, they continue, "Some researchers have explored the use of other representations, often in connection with industrial algorithms. Examples of other representations include ordered lists (for bin-packing), embedded lists (for factory scheduling problems), variable-element lists (for semiconductor layout), and the representations used by Glover and Grefenstette in this volume."

Some researchers have attempted to solve search and optimization problems using schemes patterned after evolution that employed mutation-plus-save-the-best strategies. Examples are Box (1957), Hicklin (1986), and the 1966 book by Fogel, Owens, and Walsh entitled *Artificial Intelligence Through Simulated Evolution*. The few results obtained from these efforts were highly specific to particular applications and domains and largely reflect the cleverness of implementation rather than its usefulness as a general technique for achieving adaptive increases in fitness in populations. It is important to note that mutation is not the primary means by which biological populations in nature improve their fitness and it is not the primary means used in the present invention.

Since Holland's 1975 book, Holland and various colleagues have developed a novel application of conventional genetic algorithms called a "classifier system". A classifier system is a group of rules. Each rule consists of a condition part and an action part (i.e. an IF-THEN rule). Both the condition part and action part of each rule are like the individuals in the conventional genetic algorithm in that they are a strings of 0's and 1's of fixed length. In a classifier system, messages (consisting of binary strings) are received from the environment and activate those rules whose conditional part ("IF" part) match the message (binary string) coming in. This activation triggers the action part ("THEN" part) of the rule. The action part of a rule sends out a new message (binary string).

Classifier Systems are described in the 1978 article "Cognitive Systems based on Adaptive Algorithms" (by Holland and Judith S. Reitman) published in *Pattern-Directed Inference Systems*, edited by D. A. Waterman and Frederick Hayes-Roth; and David E. Goldberg's 1983 dissertation entitled *Computer-Aided Gas Pipeline Operations Using Genetic Algorithms and Rule Learning*. In classifier systems, credit is assigned to chains of individual rules that are invoked by a credit allocation scheme known as the "bucket brigade". The Holland process is a combination of a classifier system and a "bucket brigade algorithm". A 1987 paper by Cory Fujiki and John Dickinson in *Genetic Algorithms and Their Applications: Proceedings of the Second International Conference on Genetic Algorithms*, (John J. Grefenstette, 1987) describes a computer program written in LISP for solving the Prisoner's Dilemma using binary strings of fixed length and IF-THEN classifier rules. In addition, Smith (1980, 1983) has placed IF-THEN rules in genetic strings in lieu of individual characters.

We call conventional genetic algorithms "linear" because they manipulate strings (sequences) of characters over a fixed alphabet (typically strings of binary digits 0 and 1). This is in contrast to the "non-linear" situation in which the objects being manipulated are hierarchical expressions consisting of a hierarchical arrangement of functions and arguments.

The reasons for limiting the conventional genetic algorithm to binary strings of fixed length appear in the literature. First, in his 1983 dissertation entitled *Computer-Aided Gas Pipeline Operation Using Genetic Algorithms and Rule Learning*, David E. Goldberg argues that any binary string of the common fixed length always has an interpretation (via a well-defined representation scheme) to the problem being solved. This might be called the property of being "well defined" and it is a desirable property.

Secondly, if each individual in the population consists of a binary string of fixed length, then the crossover operation will always produce another binary string of fixed length when applied to any two individuals in the population. This might be called a "closure" property and it is also a desirable property. Of course, binary strings of fixed length are not the only way of achieving these desirable properties of closure and being well-defined.

In *Adaptation in Natural and Artificial Systems* (1975, page 71), Holland argues in favor of strings consisting only of 0's and 1's (i.e. binary strings) in the conventional genetic algorithm on the basis that the number of strings in the search space that are searched automatically using what he calls the "implicit parallelism" of the conventional genetic algorithm is highest when the strings consist only of two possibilities. This point is true; however, it should not be the controlling consideration. For various reasons cited hereinafter, limiting the genetic algorithm to the one dimensional world of linear strings of fixed length (and, in particular, binary strings of fixed length) precludes solving many problems. The field of computer science is replete with other situations where it is highly unrealistic to assume that the size or shape of a problem is known in advance to the solver so that he can use this information to rigidly pre-specify the size and shape of his search in advance.

Using fixed length binary strings in conventional genetic algorithms limits their ability to solve many problems. The following two separate example problems illustrate additional limitations of conventional genetic algorithms.

First, suppose we want a computer to program itself to solve the problem of finding the point at which two intersecting straight lines intersect. The point of intersection of two straight lines is the pair of numbers that satisfy the two linear equations in two variables that represent the lines. Thus, the computer program we are seeking would use the coefficients of the two equations and various mathematical operators (such as multiplication, subtraction, etc.) to produce the desired answer. To make the problem of having a computer learning to program itself more realistic, it is best not to specify in advance the size or shape of the mathematical expression needed to solve the problem. It is also more realistic if the computer had access to various irrelevant inputs and extraneous mathematical operations that might confuse its search to find the solution to the problem.

There is no simple or convenient way to uniquely associate a binary string whose length is predetermined in advance with an arbitrary mathematical expression composed of specified mathematical operations (functions) and arguments. A binary string of length n can only represent $2^n$ different things (no matter what the representation scheme). No matter how large an n is pre-selected in advance, there are additional mathematical expressions.

Before continuing, it should be emphasized that it is not necessary to represent things of infinite size. Rather, what should be avoided is arbitrarily pre-setting a limit on the size and shape of the things being represented (even though any particular thing will itself be finite in size). In most problems, the size and shape of the solution are not necessarily known in advance. The process of solving the problem should be free to develop proposed solutions without any pre-set limit on the size and shape of the solution.

Even if an arbitrary maximum length specified in advance were acceptable, the method for associating each arbitrary mathematical expression (for example: A * B+C−D * E * F) with a binary string would necessarily obscure the underlying mathematical operations involved. The highly complex method used by Godel in 1931 in his proof of the Incompleteness Theorem is an example of such a method for making this kind of association. Thus, this first example problem highlights the need to be able to represent arbitrary mathematical expressions (involving various functions and arguments) whose length is not arbitrarily limited in advance (rather than merely strings of 0's and 1's of the same fixed length).

It should be noted that if it is assumed that the two straight lines in this problem always intersect, the problem is entirely numerical. However, if the two lines might possibly be parallel, the answer from a computer program to this expanded version of the problem might appropriately be a symbolic response (e.g. "The Equations are inconsistent and the lines are parallel") rather than the numeric location of the point of intersection. This situation can be easily recognized by a computer program by checking to see if a certain computed value (the determinant) is zero. Thus, this expanded version of this first example problem highlights the need occasionally to accommodate symbolic processing and symbolic output from a computer program that normally produces a numeric output.

Second, consider the problem of predicting the future elements of a sequence of numbers from a sampling of early numbers from the sequence. This problem is an example of induction. Induction is the logical process by which one observes specific examples of some process (e.g. "The sun has come up every morning so far during my life") and then "induces" a reasonable underlying rule for the process (e.g. "The sun always comes up in the morning"). In applying inductive reasoning, there is no proof that the result is correct. Nonetheless, the process of induction is very important and indeed lies at the heart of all learning.

In contrast, deduction is the logical process in which one starts with some given premises (or facts) and some deductive rules of inference and then reaches a logical conclusion by repeatedly applying the deductive rules to the original given premises or facts. The sequence of steps used in deduction to reach a conclusion is called the proof.

If one is given a sampling of a sequence of numbers such as 0, 2, 4, 6, 8, 10, 12, 14 it is not difficult to reasonably induce that the next number in the sequence is 16. The number 16 is a reasonable induction because each previous element of the sequence is 2 times the element's position in the sequence (counting the first element as position 0). Note, however, that even elements of this simple numerical sequence cannot be represented with strings whose length has been specified in advance.

More interesting sequences involve more complicated mathematical operations. For example, the 6th element of the sequence 2, 4, 8, 16, 32, can be expressed directly in mathematics as 2 raised to the 6th power (i.e. 64). This sequence can also be expressed in mathematics using a recursion—that is, by defining the 6th element in terms of previous element(s) in the sequence. In this case, the $m^{th}$ element of the sequence is 2 times element $m-1$ of the sequence (that is, 2 times 32 is 64).

For some important mathematical sequences of integers, there is no known non-recursive expression for each element of the sequence, and the use of a recursion becomes a necessity, not merely an option. The well-known Fibonacci sequence 1, 1, 2, 3, 5, 8, 13, 21, 34, 55, is constructed by adding the 2 previous elements of the sequence. For example, 8 is the sum of 3 and 5, and 13 is the sum of 5 and 8. In general, the $m^{th}$ element of the Fibonacci sequence is the sum of element $m-1$ and element $m-2$ of the sequence (with the understanding that the first two elements of the sequence are a "default" value of 1).

Thus, the problem of sequence induction highlights the need to be able to represent recursions as well as arbitrary mathematical expressions (involving functions and arguments). It also re-emphasizes the need to be able to represent strings whose length has not been pre-specified in advance.

Many problems are best approached by developing hierarchies in which solutions to sub-problems are manipulated and assembled hierarchically into solutions to the original main problem. In fact, many mathematical problems are solved by first "decomposing" a larger problem into smaller sub-problems. Then, an attempt is made to solve each of the sub-problems. And, finally, the solutions to the sub-problems are asembled into a solution to the original problem. The problem of solving large numbers of equations with many variables and solving polynomial equations of high order are examples of problems where decomposition can be used. In some cases, there is a symmetry between this process of assembly and the solution to the individual sub-problems. That is, in this assembly process, the solutions to the sub-problems may be manipulated as if they themselves were merely the elements of a sub-problem.

Even when no symmetry is involved, a "hierarchy" develops when a problem is solved by decomposition. At the lowest level of the hierarchy, the sub-problem is solved. The hierarchy consists of combining the solutions of the sub-problem into the solution to the larger problem. Something similar is commonplace in computer programming in general. For example, sub-routines (or sub-procedures) are typically called by a main program. The main program is at the top of the hierarchy, typically organized to provide an overview of the solution to the whole problem. Each of the sub-routines called by the main program are found at one level lower on the hierarchy. If one of the sub-routines itself happens to call upon another sub-routine, that second sub-routine is one level lower on the hierarchy than the sub-routine which called it. Complex social organizations (such as corporations and military organizations), are similarly organized into hierarchies. The ability to decompose problems into hierarchies of sub-problems is generally important for solving problems.

What is needed is a way to apply some of the general principles of biological natural selection that are embodied in the conventional genetic algorithm (i.e. survival of the fittest and crossing over of parent's traits to offspring) to a greatly expanded class of problems. In particular, what is needed is a method for adaptively creating computer programs involving complicated combinations of mathematical functions and their arguments, recursions, symbolic processing, and complicated data structures with no advance limitations on the size, shape, or complexity of the programs. One object of the present invention is to provide a genetic process to provide solutions for an expanded class of problems. A further object of the present invention is to provide a genetic process without any predetermined limits on the size, shape, or complexity of the members of the subject population.

It should be noted, however that the conventional genetic algorithm imposes at least five important limitations which restrict its usefulness in solving a broad range of problems.

First, the requirement that each individual in the population be a string of the same length arbitrarily limits consideration to only a pre-determined number of situations, cases, or states of the problem environment.

Secondly, the use of a binary string (a string of 0's and 1's) leads to a representation scheme involving an explosively large number of "different" solutions merely to handle consideration of only a few past populations. In contrast, if the representation scheme were not required to be rigidly structured in advance prior to the start of operation of the conventional genetic algorithm, a representation scheme involving only a relative handful of relevant possible histories might have evolved.

Thirdly, the individuals in the population are representational descriptions (codings) of a solution (as opposed to being actionable procedures which directly implement the solution). Any particular solution that one envisions and wants to include in the population must be first coded into a binary string of fixed length before it can be inserted into the population. Before any solution can be implemented, the binary string must be decoded into actionable instructions.

Fourthly, the binary strings of fixed length provide no hierarchical structure for potential solutions to the problem. The binary string is one dimensional. All items in the string operate at the same level.

Fifth, it is often true that conventional genetic algorithms are extremely efficient in searching large, complex, non-linear spaces to find an area that is especially good, but that other search techniques are better than conventional genetic algorithms in zeroing in on the final, precise, global optimum value in the search space. Thus, for some problems, it is common to use conventional genetic algorithms to quickly find the best neighborhood of the overall search space and then to switch to another search technique (such as simulated annealing or hill-climbing) to zero in on the precise global optimum value. This shortcoming of conventional genetic algorithms is, for many problems, the direct result of the fixed representation scheme selected at the beginning of the process. If the representation scheme were adaptive (i.e. not fixed), it could change its size and shape after getting into the right general neighborhood of the solution. It could then become more refined so that it would be capable of finding the precise global optimum solution to the problem.

Background on Genetic Programming Paradigm

Representation is a key issue in genetic algorithm work because genetic algorithms directly manipulate the coded representation of the problem and because the representation scheme can severely limit the window by which the system observes its world. Fixed length character strings present difficulties for some problems—particularly problems in artificial intelligence where the desired solution is hierarchical and where the size and shape of the solution is unknown in advance. The need for more powerful representations has been recognized for some time (De Jong 1985, De Jong 1987, De Jong 1988).

The structure of the individual mathematical objects that are manipulated by the genetic algorithm can be more complex than the fixed length character strings. Smith (1980, 1983) departed from the early fixed-length character strings by introducing variable length strings, including strings whose elements were if-then rules (rather than single characters). Holland's introduction of the classifier system (1986) continued the trend towards increasing the complexity of the structures undergoing adaptation. The classifier system is a cognitive architecture into which the genetic algorithm is embedded so as to allow adaptive modification of a population of string-based if-then rules (whose condition and action parts are fixed length binary strings).

In addition, we have recently shown that entire computer programs can be genetically bred to solve problems in a variety of different areas of artificial intelligence, machine learning, and symbolic processing (Koza 1989, 1990). In this recently developed "genetic programming" paradigm, the individuals in the population are compositions of functions and terminals appropriate to the particular problem domain. The set of functions used typically includes arithmetic operations, mathematical functions, conditional logical operations, and domain-specific functions. Each function in the function set must be well defined for any element in the range of every other function in the set which may appear as an argument to that function. The set of terminals used typically includes inputs (sensors) appropriate to the problem domain and various constants. The search space is the hyperspace of all possible compositions of functions that can be recursively composed of the available functions and terminals. The symbolic expressions (S-expressions) of the LISP programming language are an especially convenient way to create and manipulate the compositions of functions and terminals described above. These S-expressions in LISP correspond directly to the "parse tree" that is internally created by most compilers.

The basic genetic operations for the genetic programming paradigm are fitness proportionate reproduction and crossover (recombination). Fitness proportionate reproduction is the basic engine of Darwinian reproduction and survival of the fittest and operates for genetic programming paradigms in the same way as it does for conventional genetic algorithms. The crossover operation for genetic programming paradigms is a sexual operation that operates on two parental programs (i.e. LISP S-expressions) and produces two offspring S-expressions using parts of each parent. In particular, the crossover operation creates new offspring S-expressions by exchanging sub-trees (i.e. sub-lists) between the two parents. Because entire sub-trees are swapped, this genetic crossover (recombination) operation produces syntactically and semantically valid LISP S-expressions as offspring regardless of which allowable point is selected in either parent.

This genetic algorithm paradigm has been successfully applied (Koza 1989, 1990) to example problems in several different areas, including, but not limited to, (1) machine learning of functions (e.g. learning the Boolean 11-multiplexer function), (2) planning (e.g. developing a robotic action sequence that can stack an arbitrary initial configuration of blocks into a specified order), (3) automatic programming (e.g. discovering a computational procedure for solving pairs of linear equations, solving quadratic equations for complex roots, and discovering trigonometric identities), (4) sequence induction (e.g. inducing a recursive computational procedure for the Fibonacci and the Hofstadter sequences), (5) pattern recognition (e.g. translation-invariant recognition of a simple one-dimensional shape in a linear retina), (6) optimal control (e.g. centering a cart and balancing a broom on a moving cart in minimal time by applying a "bang bang" force to the cart), (7) symbolic "data to function" regression, symbolic "data to function" integration, and symbolic "data to function" differentiation, (8) symbolic solution to functional equations (including differential equations with initial conditions, integral equations, and general functional equations), (9) empirical discovery (e.g. rediscovering Kepler's Third Law, rediscovering the well-known econometric "exchange equation" $MV = PQ$ from actual time series data for the money supply, the velocity of money, the price level, and the gross national product of an economy), and (10) simultaneous architectural design and training of neural networks.

Co-evolution in Nature

The evolutionary process in nature is often described as if one population of individuals is trying to adapt to a fixed environment. This simplified description is, however, only a first order approximation to the actual situation. The environment actually consists of both the physical global environment (which is usually relatively unchanging) as well as other independently-acting biological populations of individuals which are simultaneously trying to adapt to "their" environment. The actions of each of these other independently-acting biological populations (species) usually affect all the others. In other words, the environment of a given species includes all the other biological species that contemporaneously occupy the physical environment and which are simultaneously trying to survive. In biology, the term "co-evolution" is sometimes used to reflect the fact that all species are simultaneously co-evolving in a given physical environment.

A biological example presented by Holland illustrates the point (1990). A given species of plant may be faced with an environment containing insects that like to eat it. To defend against its predators (and increase its probability of survival), the plant may, over a period of time, evolve a tough exterior that makes it difficult for the insect to eat it. But, over a period of time, the insect may evolve a stronger jaw so that the insect population can continue to feed on the plant (and increase its probability of survival). Then, over an additional period of time, the plant may evolve a poison to help defend itself further against the insects. But, then again, over a period of time, the insect may evolve a digestive enzyme that negates the effect of the poison so that the insect population can continue to feed on the plant.

In effect, both the plant and the insects get better and better at their respective defensive and offensive roles in this "biological arms race". Each species changes in response to the actions of the other.

Co-evolution and Genetic Processes

In the "genetic algorithm," described by John Holland in his pioneering book *Adaptation in Natural and Artificial Systems* (1975), a population of individuals attempts to adapt to a fixed "environment." In the basic genetic algorithm as described by Holland in 1975, the individuals in the population are fixed-length character strings (typically binary strings) that are encoded to represent some problem in some way. In the basic "genetic algorithm", the performance of the individuals in the population is measured using a fitness measure which provides information from the "environment" in the form of payoff. Over a period of many generations, the genetic algorithm causes the individuals in the population to adapt in a direction that is dictated by the fitness measure (its environment).

Some work has been done to extend Holland's 1975 genetic algorithm to co-evolutionary situations.

Holland (1990) has incorporated co-evolution and genetic algorithms in his ECHO system for exploring the co-evolution of artificial organisms described by fixed-length character strings (chromosomes) in a "miniature world." In ECHO, there is a single population of artificial organisms. The environment of each organism and the physical global environment includes all other organisms.

Miller (1988, 1989) has used co-evolution in a genetic algorithm to evolve a finite automaton as the strategy for playing the Repeated Prisoner's Dilemma game. Miller's population consisted of strings (chromosomes) of 148 binary digits to represent finite automata with 16 states. Each string in the population represented a complete strategy by which to play the game. That is, it specified what move the player was to make for any sequence of moves by the other player. Miller then used co-evolution to evolve strategies. Miller's co-evolutionary approach contrasts with Alexrod's (1987) solution to the repeated prisoner's dilemma using genetic algorithms. Axelrod measured performance of a particular strategy with a fixed weighted mix of the strategy's results against eight superior opposing computer programs submitted in an international programming tournament for the prisoner's dilemma. A best strategy for one player (represented as a 70 bit string with a 3-move look-back) was then evolved with the weighted mix of eight opposing computer programs serving as the environment.

Hillis (1990) used co-evolution in genetic algorithms to solve optimization problems using fixed length character strings.

What is needed is a way to apply some of the general principles of biological natural selection that are embodied in the conventional genetic algorithm (i.e. survival of the fittest and crossing over of parents' traits to offspring) to co-evolving populations of hierarchical arrangements of functions and arguments that can vary in size and shape. In particular, what is needed is a method for adaptively creating computer programs involving complicated combinations of mathematical functions and their arguments, recursions, symbolic processing, and complicated data structures with no advance limitations on the size, shape, or complexity of the programs. This method for adaptively creating computer programs must be able to operate with the constraint that a best or optimal solution to a problem is not necessarily known. One object of the present invention is to provide a co-evolution genetic process to provide solutions for an expanded class of problems. A further object of the present invention is to provide a co-evolution genetic process without any predetermined limits on the size, shape, or complexity of the members of the subject populations where an optimal solution is not necessarily known.

REFERENCES CITED

U.S. Patents

U.S. Pat. No. 4,821,333, "Machine learning procedures for generating image domain feature detector structuring elements", issued Apr. 11, 1989, filed Aug. 22, 1986, Gillies.

U.S. Pat. No. 4,935,877, "Non-Linear Genetic Algorithms for Solving Problems", issued Jun. 19, 1990, filed May 20, 1988, Koza.

U.S. Pat. No. 4,697,242, "Adaptive Computing System Capable of Learning and Discovery", issued Sep. 29, 1987, filed Jun. 11, 1984, Holland et al.

U.S. Pat. No. 4,881,178, "Method of Controlling a Classifier System", issued Nov. 14, 1989, filed May 7, 1987, Holland et al.

OTHER PUBLICATIONS

Axelrod, Robert (Editor), "The Evolution of Strategies in the Iterated Prisoner's Dilemma" In *Genetic Algorithms and Stimulated Annealing*, p. 32, Pittman, London 1987.

Binmore, Kenneth G. and Larry Samuelson, "Evolutionary Stable Strategies in Repeated Games Played by Finite Automata" (Draft), Sixth World Congress of the Econometric Society, Barcelona, Spain, Aug. 1990.

Davis, Lawrence (Editor)—*Genetic Algorithms and Simulated Annealing*, Pitman, London 1987.

De Jong, Kenneth A. Genetic algorithms: A 10 year perspective. *Proceedings of an International Conference on Genetic Algorithms and Their Applications*. Hillsdale, N.J.: Lawrence Erlbaum Associates 1985.

De Jong, Kenneth A. "On Using Genetic Algorithms to Search Program Spaces", *Genetic Algorithms and Their Applications: Proceedings of the Second International Conference on Genetic Algorithms*, Hillsdale, N.J.: Lawrence Erlbaum Associates 1987.

De Jong, Kenneth A. Learning with genetic algorithms: an overview. *Machine Learning*, 3(2), 121-138, 1988.

Fogel, L. J., Owens, A. J. and Walsh, M. J.—*Artificial Intelligence through Simulated Evolution*, New York: John Wiley 1966.

Fujiki, Cory—*An Evaluation of Holland's Genetic Operators Applied to a Program Generator*, Master of Science Thesis, Department of Computer Science, University of Idaho, 1986.

Goldberg, David E.—*Computer-Aided Gas Pipeline Operation Using Genetic Algorithms and Rule Learning*, (Doctoral Dissertation, University of Michigan, 1983) Dissertation Abstracts International 44(10), 3174B (University Microfilms No. 8402282).

Goldberg, David E., *Genetic Algorithms in Search, Optimization, and Machine Learning*, Reading, Mass.: Addison-Wesley 1989.

Green, Cordell C. et al., *Progress Report on Program-Understanding Systems*, Stanford Artificial Intelligence Laboratory memo AIM-240, Stanford University Computer Science Department, August 1974.

Grefenstette, John J. (Editor)—*Proceedings of an International Conference on Genetic Algorithms and Their Applications*, Pittsburgh, Pa. 1985.

Grefenstette, John J. (Editor)—*Genetic Algorithms and Their Applications: Proceedings of the Second International Conference on Genetic Algorithms*, Lawrence Erlbaum Associates, Hillsdale, N.J. 1987.

Hicklin, Joseph F.—*Application of the Genetic Algorithm to Automatic Program Generation*, Master of Science Thesis Department of Computer Science, University of Idaho, 1986.

Hillis, W. Daniel, "Co-Evolving Parasites Improve Simulated Evolution as an Optimizing Procedure", Emergent Computation: Self-organizing, Collective, and Cooperative Computing Networks, edited by S. Forrest, Cambridge, Mass., MIT Press 1990.

Holland, John H.—*Adaptation in Natural and Artificial Systems*, The University of Michigan Press, Ann Arbor, 1975.

Holland, John H. Escaping brittleness: The possibilities of general-purpose learning algorithms applied to parallel rule-based systems. In Michalski, Ryszard S., Carbonell, Jaime G. and Mitchell, Tom M. *Machine Learning: An Artificial Intelligence Approach, Volume II*. P. 593-623. Los Altos, Calif.: Morgan Kaufman 1986.

Holland, J. H. "ECHO: Explorations of Evolution in a Miniature World." In *Proceedings of the Second Conference on Artificial Life*, edited by C. G. Langton, and J. D. Farmer, J. Doyne, Redwood City, Calif.: Addison-Wesley. 1990. In Press.

Holland, J. H., & Reitman, J. S. (1978), Cognitive systems based on adaptive algorithms, In D. A. Waterman & F. Hayes-Roth (Eds.), *Pattern Directed Inference Systems* (pp. 313-329), New York: Academic Press.

Isaacs, Rufus, *Differential Games*, New York: John Wiley 1965.

Jefferson, David, Collins, Rob, et. al. "The Genesys System: Evolution as a Theme in Artificial Life." In *Proceedings of the 11th Iternational Joint Conference on Artificial Life*, edited by C. G. Langton and D. Farmer. Redwood City, Calif.: Addison-Wesley. 1990. In Press.

Koza, John R., *Genetic Programming: A Paradigm for Genetically Breeding Populations of Computer Programs to Solve Problems*, Stanford University, Dept. of Computer Science, Report No. STAN-CS-90-1314, June 1990. 1990.

Koza, John R., Hierarchical genetic algorithms operating on populations of computer programs, *Proceedings of the 11th International Joint Conference on Artificial Intelligence (IJCAI)*; San Mateo, Calif.: Morgan Kaufman 1989.

Lenat, Douglas B. AM: *An Artificial Intelligence Approach to Discovery in Mathematics as Heuristic Search*, PhD Dissertation, Computer Science Department, Stanford University, 1976.

Lenat, Douglas B., The role of heuristics in learning by discovery: Three case studies, In Michalski, Ryszard S., Carbonell, Jaime G. and Mitchell, Tom M., *Machine Learning: An Artificial Intelligence Approach*, Volume I, P. 243-306, Los Altos, Calif.: Morgan Kaufman 1983.

Miller, J. H. "The Evolution of Automata in the Repeated Prisoner's Dilemma." In *Two Essays on the Economics of Imperfect Information*. PhD dissertation, Department of Economics, University of Michigan, 1988.

Miller, John H., "The Coevolution of Automata in the Repeated Prisoner's Dilemma", Santa Fe Institute and Carnegie-Mellon University, Document No. 89-003, Oct. 15, 1987.

Schaffer, J. D. (editor), *Proceedings of the 3rd International Conference of Genetic Algorithms*, San Mateo, Calif.: Morgan Kaufman Publishers Inc. 1989.

Smith, Steven F., *A Learning System Based on Genetic Adaptive Algorithms*, PhD dissertation, Pittsburgh: University of Pittsburg, 1980.

Smith, Steven F., Flexible learning of problem solving heuristics through adaptive search, *Proceeding of the 8th International Conference on Artificial Intelligence*, Karlsruhe, Germany: Morgan Kaufman 1983.

Tanese, Reiko, *Distributed Genetic Algorithm For Function Optimization*, PhD. dissertation, Department of Electrical Engineering and Computer Science, University of Michigan, 1989.

Wilson, Stewart, W. Hierarchical credit allocation in a classifier system. *Proceedings of the Tenth International Joint Conference on Artificial Intelligence*, 217-220, 1987.

SUMMARY OF THE INVENTION

The present invention relates to non-linear genetic processes using co-evolving populations. The process of the present invention operates upon a plurality of co-evolving populations of entities which accomplish tasks. Each entity can vary in size and shape. The process comprises a series of steps including designating an evolving population, activating, assigning, selecting, choosing, creating, reproducing, and adding entities from the designated evolving population. First, one population of the plurality of populations is designated as the evolving population. Next, at least one entity from the evolving population activates to perform its task and produces a result. Next, a value is associated with the result of the activation of each entity and assigned to the corresponding entity. The value associated with the result for the activated entity in the evolving population is computed relative to the result of the activation of a plurality of entities from at least one of the other populations (environmental populations) different from the evolving population. Then, at least one entity in the evolving population having a relatively high associated value is selected. Next, an operation is chosen from crossover or reproduction. In addition, other operations such as mutation, permutation, or "define building blocks" may be used. An editing function may also be used.

If crossover is chosen, then the selected entity (and at least one other entity) performs the crossover operation. Crossover creates new entities by combining portions of at least one selected entity with portions of at least one other entity. Reproduction retains the selected entity in the evolving population. Mutation randomly alters a small random part of an entity. Permutation reorders the parts of an entity without a net gain or loss. Define Building Block replaces portions of an entity with a building block not subject to disruptive operations.

Finally, the newly produced entities are added to the evolving population. One of the plurality of populations (environmental populations) different from the current evolving population is then designated as the evolving population and the process repeats for the new evolving population.

Computer programs have the ability to perform alternative computations conditioned on the outcome of intermediate calculations, to perform computations on variables of many different types, to perform iterations and recursions to achieve the desired result, and to define and subsequently use computed values and subprograms. This flexibility found in computer programs facilitates the solution to the various problems solved by the present invention.

The process of solving these problems can be reformulated as a search for a most fit individual computer program in the space of possible computer programs. In particular, if the LISP programming language is being used to implement this search, the search space is the hyperspace of LISP "symbolic expressions" (called S-expressions) composed of various terms (called atoms in LISP) along with standard arithmetic operations, standard programming operations, standard mathematical functions, and various functions peculiar to the given problem domain. For example, the standard arithmetic functions of addition, subtraction, multiplication, etc., are relevant when we are attempting to construct a mathematical expression that might be the solution to a differential equation. In general, the objects that are manipulated in our attempts to build computer programs are of four types. These objects include functions of various number of arguments, such as the addition function mentioned above; variable atoms, such as the independent variable(s) in an equation; constant atoms, such as 0, 1, etc.; and control structures such as If-Then-Else, Do-Until, etc.

The LISP S-expression required to solve each of the problems described above tends to emerge from a simulated evolutionary progression using the non-linear genetic process. This process starts with a plurality of initial populations of LISP S-expressions (typically randomly generated) each composed of functions and atoms appropriate to the problem domain.

The fitness of each individual LISP S-expression in each population drives the process. In many problems, fitness can be measured by the sum of the distances or errors (taken for all the cases) between the point in the solution space (whether, for example, real-valued, complex-valued, vector-valued, multiple-valued, Boolean-valued, integer-valued, or symbolic-valued) created by the S-expression for a given set of arguments and the solution created by entities in different populations. In other problems, other fitness measures can be used. The performance of each individual LISP S-expression in an evolving population is thus tested against individual LISP S-expressions from each of the other populations of the plurality of populations. This testing between populations is used to generate the relative fitness for each individual. If fitness is the sum of distances (errors), the closer this fitness sum is to zero, the better the S-expression. Once the desired level of fitness is attained, the iteration of the evolutionary process can be terminated.

The initial individual S-expressions in each population typically will have exceedingly poor fitness. Nonetheless, some individuals in these populations will be somewhat more fit than others.

The process is based on the Darwinian principle of reproduction and survival of the fittest and the genetic operation of crossover (recombination) to create a new population of individuals. In particular, a genetic process of sexual reproduction (crossover) among two parental S-expressions will be used to create offspring S-expressions. At least one of the two participating parental S-expressions will be selected based on fitness. Typically, this selection is proportional to fitness (i.e. fitness proportionate reproduction), although other selection methods (such as tournament selection) may be used. The resulting offspring S-expressions will be composed of sub-expressions from their parents.

In addition, other operations such as mutation and permutation define building blocks and editing may be used.

Finally, the new populations of offspring (i.e. the new generation) will replace the old populations of parents and the process will continue until a desirable solution is found.

At each stage of this highly parallel, locally controlled and decentralized process, the state of the process need consist only of the current populations of individuals. Moreover, the only input to the process will be the observed fitness of the individuals in each current population in grappling with the problem environment.

This process produces populations which, over a period of generations, tend to exhibit increasing average fitness in dealing with the environment consisting of the other populations (and the global environment), and which, in addition, can robustly (i.e. rapidly and effectively) adapt to changes in their environment and other populations.

The solution produced by this process at any given time can be viewed as an entire population of distinctive alternatives (typically with improved overall average fitness). The solution may alternatively be a subset of the population that collectively attains a pre-established degree of fitness (e.g. average level of fitness). More commonly, the solution may be the single best individual in a population at that time ("winner take all"). When the individuals in the population are viewed as alternative strategies (as in a game), the population as a whole may be viewed as a mixed strategy. In this situation, each individual strategy in the population is equally likely to be chosen for execution. That is, the actual play that is executed is the one individual strategy drawn at random from out of the population. Thus, a strategy appearing 10% of the time in the population would be played 10% of the time. Many competitive situations (i.e. games) can only be optimally solved by such a mixed (probabilistic) strategy.

The hierarchical character of the computer programs is an essential aspect of the process. The results of this process are inherently hierarchical and in many cases the results contain default hierarchies which often solve the problem in a relatively parsimonious way.

The dynamic variability of the size and shape of the computer programs that are developed along the way to a solution are also an essential aspect of the process. In each case, it would be difficult and unnatural to try to specify or restrict the size and shape of the eventual solution in advance. Moreover, the advance specification or restriction of the size and shape of the solution to a problem narrows the window by which the system views the world and might well preclude finding the solution to the problem.

DETAILED DESCRIPTION OF THE INVENTION

Figure 1:
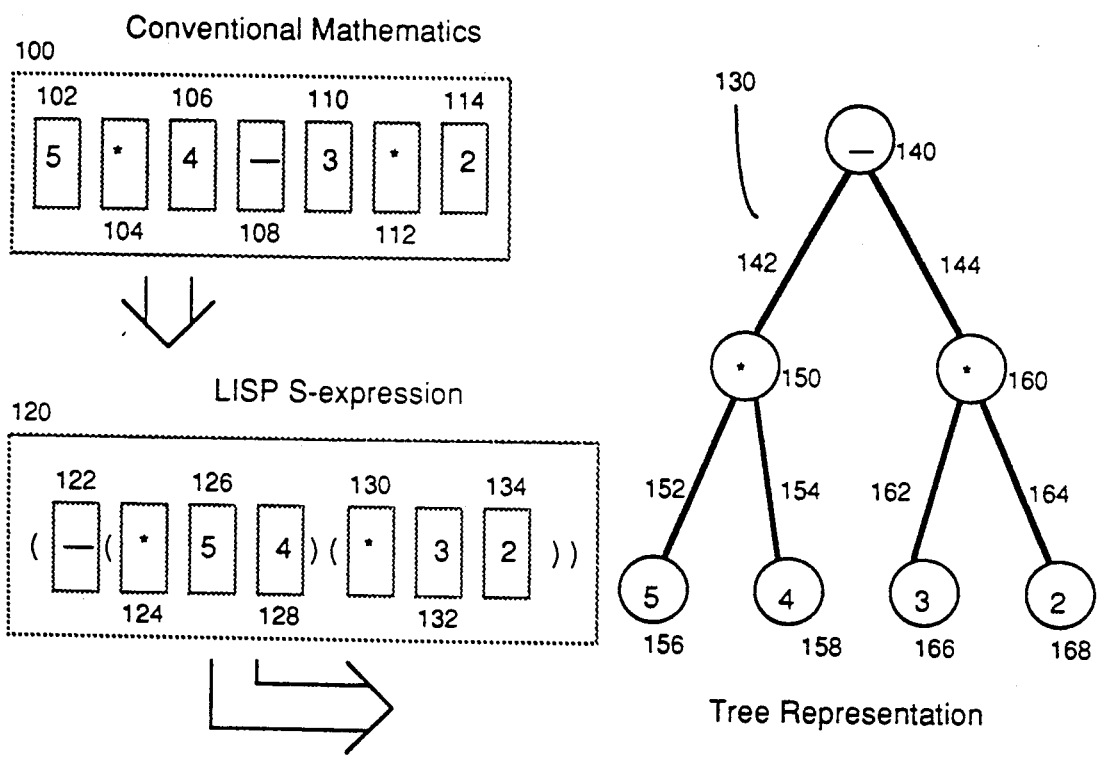
FIG. 1 is a tree diagram representation of a LISP S-expression.

The present invention describes a non-linear genetic process for problem solving using co-evolving populations. In the following description, numerous specific details are set forth in order to provide a thorough understanding of the present invention. It will be apparent, however, to one skilled in the art that the present invention may be practiced without using these specific details. In other instances, well-known methods and structures have not been described in detail so as not to unnecessarily obscure the present invention.

The present invention operates on a plurality of populations of entities. The entities must possess an ability to produce an objectively observable result. To provide utility, the entities must direct their actions toward a constructive end, even if their results do not always serve those ends. The iterative process of the present invention produces populations which tend to accomplish their constructive ends better than previous populations.

Although the preferred embodiment uses computer programs as entities, using other types of entities remain within the scope and spirit of the present invention. For example, electrical circuits could provide a population for the iterative process of the present invention. The circuits could reproduce and recombine sub-circuits from two parental circuits until a circuit performing the desired behavior (function) is attained. Additionally, different automobile designs could comprise another population, with elements or sub-processes of the designs taken as different alleles for crossover and rearrangement. Thus although the following description uses computer programs as entities, the description does not limit the present invention. Further, the use of sequential iteration is only a preferred embodiment. Methods for the use of parallel processing is also presented.

The Representation of Populations

The computer languages FORTRAN, COBOL, ALGOL, PL/1, FORTH, PASCAL, C, PROLOG, ADA, BASIC, etc. provide, in general, the ability to write complicated mathematical expressions, recursions, complex data structures, and symbolic expressions. Using any of these languages, one can write symbolic expressions that are executable as computational procedures (or programs) within the language itself. Also, any of these languages can generate symbolic expressions, although often this process is inconvenient and inefficient. In general, most computer languages do not allow arbitrarily complex expressions to be written. Also, most do not delay assigning actual computer memory (and types) in the computer for such expressions until just prior to actual execution of the expression. Such a memory management method is termed dynamic storage allocation.

One existing computer language, however, has all the features discussed above and is generally available in relatively efficient forms on a variety of computers. This language is LISP, and is the computer language of choice for many artificial intelligence applications. Many dialects of the LISP language have been created over the years. A dialect of LISP called "Common LISP" has started to emerge as a standard.

The LISP programming language's basic structure is a list of items (an ordered set of items contained within a pair of parentheses). An important source of LISP's simplicity, generality, and power arises from treating the first element in every list encountered as a function to be executed, termed "evaluated", and treating the remaining elements of the list as arguments to that function. Moreover, unless otherwise indicated, LISP reads, evaluates, and returns a value for each such function it encounters. Thus, in LISP, entire computer programs can appear as merely functions within functions within functions (often called "compositions" of functions and arguments or more simply a "composition" of functions). Applying functions to arguments as encountered controls the flow of LISP programs. In other words, the control structures in LISP are based on composition of functions.

Within the outermost pair of parentheses in LISP, there may be numerous functions and operators, including functions for performing arithmetic, functions for performing recursions, functions for modifying symbolic expressions, functions for conditionally varying the program flow, and other complex functions. A key feature of LISP is that LISP programs have the same form as the data they manipulate. As the above features indicate, LISP is a functional programming language. LISP is not the only existing functional programming language nor is it the only possible functional programming language. It is, however, the most widely used language in this category and well-suited for the requirements at hand.

In spite of the complex results obtained, LISP can be viewed as being very simple because it simply reads, evaluates, and returns a value for each such function it encounters. This seeming simplicity gives LISP enormous flexibility (including the flexibility to accommodate computational procedures which modify themselves and execute themselves). This enormous flexibility makes LISP the preferred computer language for the present invention.

For example, consider the simple mathematical expression ordinarily written as 5 * 4 − 3 * 2. To evaluate this expression, one must start by first evaluating 5 * 4. One evaluates 5 * 4 by performing the function of multiplication (*) on the two arguments (5 and 4). The basic structure in LISP is a list of items (that is, an ordered set of items contained within a set of parentheses). Moreover, unless otherwise indicated, LISP treats the first item in every list encountered as a function and the remaining items in the list as arguments to that function. Thus, LISP represents 5 * 4 as (*5 4). Here a function (i.e. the multiplication function denoted by *) is the first item of the list and the two arguments to the function (i.e. the two numbers to be multiplied) follow. Similarly, LISP denotes 3 * 2 as (*3 2). Once these two multiplications are executed (evaluated), the subtraction function then has the two arguments (i.e. 20 and 6). The two values obtained by evaluating these two multiplication functions are treated as arguments to the subtraction function which performs the operation of subtraction, which is (−(*5 4) (*3 2)). Expressions such as (−(*5 4) (*3 2)) in LISP are called symbolic expressions (S-expressions). Here the function of subtraction (−) is performed on the results previously obtained for (*5 4) and (*3 2). When a simple number or variable is used as the argument of a function (such as the 3 or 2 in the multiplication 3 * 2), it is called an "atomic" argument. The contrasting situation occurs with a composition of functions when the argument to one function is itself the result of carrying out an earlier (embedded) function. We can represent increasingly complex mathematical expressions by embedding previous results within new expressions in this manner.

It is helpful to graphically depict a functional programming language's expressions. Functional expressions can be viewed graphically as a tree with labels on the various points of the tree. In particular, any such expression can be viewed as a rooted point-labeled tree in which the internal points of the tree are labeled with functions and the endpoints of the lines radiating downwards from each such internal point is labeled with the arguments to that function. The term "downwards" in connection with root-point labeled trees means extending farther away from the root of the tree. The external points of the tree (sometimes called "leafs") are labeled with the atomic arguments. The root of the tree is the particular internal point labeled with the function executed last. In a LISP S-expression, the first function is the outer-most LISP function (i.e. the function just inside the outermost left parenthesis of the LISP S-expression).

FIG. 1 illustrates this for LISP using the equation 5 * 4 − 3 * 2. In the ordinary notation of arithmetic shown as equation 100, the function 104 (multiplication) operates on the arguments 102 and 106 (i.e. 5 and 4 respectively) and the function 112 (multiplication) operates on the arguments 110 and 114 (i.e. 3 and 2 respectively). The function 108 (subtraction) then operates on the results of these two functions as its arguments. The function 108 is higher in the hierarchy than the functions 104 and 112.

In FIG. 1, the LISP S-expression 120, (−(* 5 4) (*3 2)) is expressed as the function 124 (multiplication) operating on the arguments 126 (the number 5) and 128 (the number 4) and the function 130 (multiplication) operating on the arguments 132 (the number 3) and 134 (the number 2). The function 122 (subtraction) then operates on the results of these two evaluations.

When presented graphically in FIG. 1, the internal point 150 of the tree 130 with root 140 is labeled with the function of multiplication (*) and the external points 156 and 158 of the tree are labeled with the two arguments to the multiplication function (i.e. 5 and 4 respectively). The arguments to a given function (such as the multiplication function denoted by the internal point 150) are found by following the lines 152 and 154 radiating downwards from the internal point 150. Similarly, the internal point 160 of the tree is labeled with the function of multiplication and the external points of the tree 166 and 168 are labeled with the two arguments to the multiplication function (i.e., 3 and 2, respectively). The arguments to the function 160 are found by following the lines 162 and 164 radiating downwards from the internal point 160. The internal point of the tree 140 is labelled with the subtraction function. The arguments to the subtraction function are found by following the lines 142 and 144 radiating downwards from point 140. These arguments turn out to be the results of the previously performed multiplication operations. Arguments may be found at external points (if they are "atoms") or at internal points (i.e. when the arguments to one function, such as subtraction here at 140, are the result of previous functions). The internal point 140 is the root of the tree and is labeled with the outermost function (subtraction). Internal point 140 is equivalent to point 122 in the LISP S-expression 120 (i.e., the function just inside the outermost left parenthesis of the LISP S-expression).

The advantage of a computer language such as LISP for performing work of this kind derives from the enormous flexibility arising from repeated applications of this very simple basic structure. The functions available in LISP can include functions other than the simple arithmetic operations of multiplication and subtraction. They include more complex mathematical functions such as square roots, exponentiation, etc; program control functions such as PROGN which allow a series of LISP expressions to be performed in succession; recursions (wherein a function refers to itself in the process of evaluating itself); iterative functions (such as DOTIMES) which cause certain functions to be performed repeatedly (typically with differing arguments); conditional functions [which cause specified alternative functions to be performed if some predicate function is (or is not) satisfied]; and symbolic functions which operate on symbols (instead of numbers).

Note, therefore, that by the term "function", we do not limit ourselves to the strict mathematical meaning of the word. For example, a function in a particular problem domain, which we will call MOVE-BLOCK might be viewed as transforming one state space into another. MOVE-BLOCK might cause a block (in a simulated or in the real world) to be moved from one side of a table to the other. This can be viewed as transforming one state space in which the block is on one side of the table into a new state space in which the block is on the other side of the table. Programmers often view this as a process of side-effecting (i.e. changing the values of) state variables. Thus, by "function" we mean any construct that takes zero or more arguments, returns zero or more values, and transforms the arguments and/or side-effects some global or lexical state. Other examples of "function" using this definition could therefore be "+", which takes numbers as its arguments and returns the sum of the arguments, "PRINT" which takes an argument and prints it (to the global environment), "PROGN" which takes program segments as arguments and returns the result of evaluating its last argument after evaluating all of its other arguments in sequence, and so-called non-strict operators such as "IF" which takes program segments as arguments and returns the result of evaluating one of its arguments dependent upon the result of evaluating its "condition" argument. "MOVE-BLOCK" might be, therefore, a function that takes no arguments, returns no values and whose work consists of side-effecting the state space of the problem. One could also view MOVE-BLOCK as a function that takes an old state space as its argument and returns as its value a new and transformed state space. This definition of "function" therefore subsumes, among others, the terms function, operator, procedure, macro, NLAMBDA and Special Form in LISP and in other programming languages.

Figure 2:
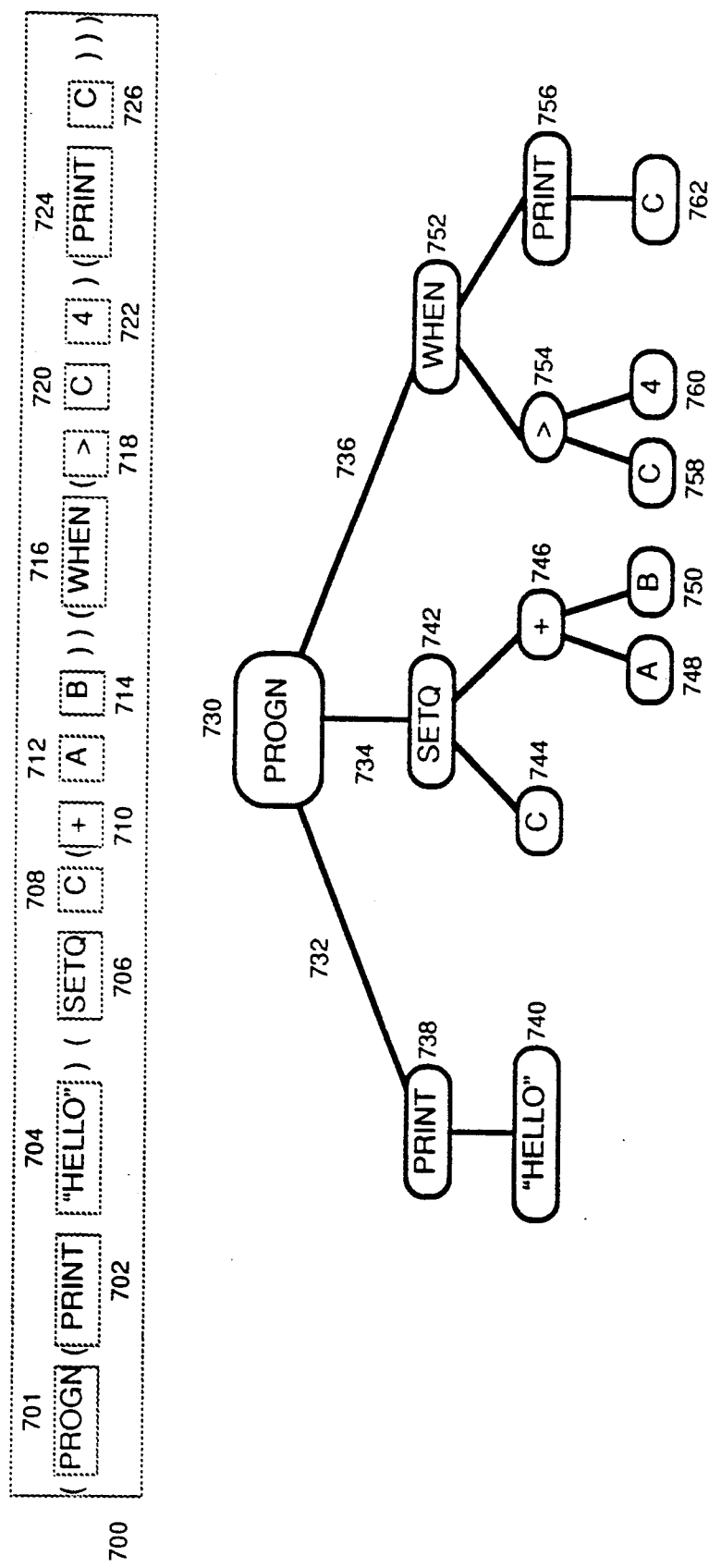
FIG. 2 is a tree diagram representation of a LISP program.

By way of an example, suppose we want a computer program to begin by printing the symbolic string "HELLO"; then set the variable C to the sum of the variables A and B; and, then print the value of C only when C is greater than 4. In FIG. 2, the LISP S-expression (i.e. program) 700 performs these tasks. The function 701 PROGN allows a series of 3 major steps to be combined together into one program. The first major step of the series involves the function 702 (PRINT) operating on the symbolic string argument 704 ("HELLO"). The second major step involves the function 706 (SETQ) operating on a variable 708 (C) and the result obtained from the function 710 (addition) operating on the arguments 712 (the variable A) and 714 (the variable B). The SETQ function assigs a value (its second argument) to a variable (its first argument). Finally, the third major step involves the conditional function 716 (WHEN) operating on two arguments. The first argument is a predicate function involving the relationship 718 (greater than) operating on the arguments 720 (the variable C) and 722 (the number 4). The second argument is the function 724 (PRINT) operating on the argument 726 (the variable C).

Graphically, this LISP program (S-expression) can be represented as a tree whose internal points are labeled with functions and where the endpoints of the lines radiating downwards from each such internal point is labeled with the arguments to that function. In this graphical representation, one of the internal points is the root of the tree and the root is labeled with the function that appears just inside the first left parenthesis of the LISP S-expression.

Here, the root of the tree 730 is labeled with the function PROGN. The function PROGN has 3 arguments. The 3 lines 732, 734, and 736 radiating downwards from the internal point 730 (the root) correspond to the 3 arguments of PROGN. The first argument of PROGN is function 738, the PRINT function. It is the endpoint of the first line 732 radiating downwards from internal point 730. The function PRINT has one argument 740. In the case of the PRINT function, it has one argument which it prints. In this case, the argument is the symbolic string 740 "HELLO". This string 740 "HELLO" is an atomic argument and appears at an external point (leaf) of the tree.

The second argument of PROGN is function 742, the SETQ function. The function SETQ has two arguments 744 and 746. The second argument of SETQ is itself a function 746 (addition) operating on the two arguments 748 (the variable A) and 750 (the variable B). The two arguments 748 and 750 are the variables A and B (atoms in LISP). They appear at external points (leafs) of the tree. The first argument of SETQ is 744 (the variable C) which is set to the sum of the values of A and B.

The third argument of PROGN is function 752, the WHEN function. The function WHEN has two arguments, 754 and 756. The first argument of the WHEN function is a predicate function 754 (greater than). The predicate function 754> has two arguments 758 (the value of variable C) and 760 (the number 4). The predicate function 754> returns a value of T (for "True") or NIL (for "False") depending on whether its first argument 758 (the variable C) is greater than its second argument 760 (the number 4). The WHEN function executes its second argument 756 (the PRINT function) if its first argument 754 evaluates as T (True). The PRINT function 756 has one argument 762 (the numeric value of the variable C). Note that the PRINT function is flexible; it can accommodate a symbolic argument (such as "HELLO" at 740) or a number (such as the value of variable C at 762).

Although LISP can be run on virtually any computer, it is preferable to use a computer especially designed for performing LISP functions. The Texas Instruments Explorer II computer is particularly advantageous for these purposes because it contains an especially designed microprocessor chip (called the Mega Chip) which performs LISP functions directly. The Mega Chip contains basic microcode that correspond directly to the basic operations of LISP. These include, among others, basic LISP operations for constructing stacks (which, among other things, retain references to repeated calls on functions) and performing other operations peculiar to LISP. A conventional microprocessor chip (such as the Intel 80286 contained in the IBM AT computer) can be programmed to carry out the various LISP functions by applying its generic computer instructions to the requirements of LISP.

Figure 11:
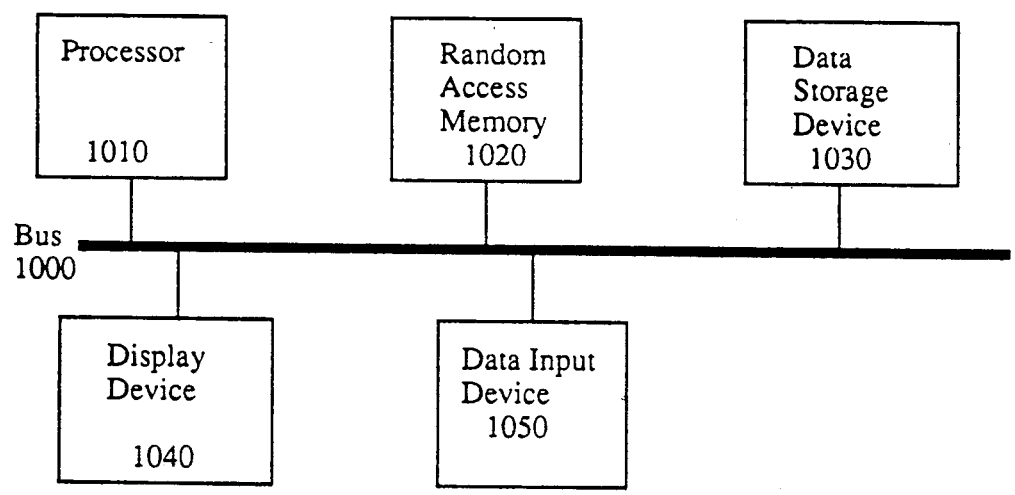
FIG. 11 illustrates a typical computer configuration.

Moreover, it is especially advantageous to run LISP programs on computers with large amounts of internal memory because the complex structures that one develops using LISP in applications such as are described here often require large amounts of memory. To the extent that computer memory is not available as internal memory in a given computer, significant inefficiencies in operation result. Since the solution to problems often require complex structures, significant inefficiencies may make the difference between being able to solve the problem or not being able to solve the problem. The preferred embodiment of the present invention uses an Explorer II computer with 32,000,000 bytes of internal memory (32 megabytes). A typical computer configuration is depicted in FIG. 11.

After generating a population of computational procedures, these procedures are executed and a value in the environment involved is assigned to the result of the execution. Thus an important requirement for any implementation of this system is the ability to generate computational procedures (computer programs) and then execute them to produce a result.

Using LISP representations on a computer having sufficient memory, the present invention can solve problems previously intractable under prior art methods. The following sections present a preferred embodiment of the present invention and specific examples of its application. First, the process itself is described. Secondly, two examples are presented showing the operation of the co-evolutionary process with two games: 1) a simple discrete game with 32 payoff points, and 2) a simple game of pursuit involving two populations (two players).

Co-Evolution and the Genetic Programming Paradigm

The process of co-evolution in nature can be combined with the genetic process to produce a "co-evolution process." In this "co-evolution process," there are two or more populations of individuals. These populations of individuals typically are initially created at random. The environment for the first population (environmental population) in the "co-evolution process" consists of a second population. And, conversely, the environment for the second population consists of the first population.

If there are more than two populations, the environment for one population consists of all the other populations. In all cases, there may be a relatively unchanging (or completely unchanging) background global environment that corresponds to the background physical environment in nature.

The co-evolutionary process typically starts with both populations being highly unfit (when measured by an absolute fitness measure, if such a measure exists). Then, the first population tries to adapt to the "environment" created by the second population. Simultaneously, the second population tries to adapt to the "environment" created by the first population.

This process is carried out by testing the performance of each individual in the first population against each individual (or a sampling of individuals) from the second population. We call this performance the "relative fitness" of an individual because it represents the performance of one individual in one population relative to the environment consisting of the entire second population. Then, each individual in the second population is tested against each individual (or a sampling of individuals) from the first population. Even though we describe the evaluation of an individual in a population and the evaluation of the population itself as an iterative process, this does not preclude concurrent execution of individual populations or whole runs.

Even though both populations are initially generally unfit, the variation that is almost always present in an initial random population will means that some individuals have slightly better relative fitness than others. That means that some individuals in each population will have somewhat better performance than others in dealing with the individuals currently in the opposing population or populations.

The operation of reproduction (based on the Darwinian principle of "survival and reproduction of the fittest) can then be applied to each population using the relative fitness of each individual currently in each population. In addition, the operation of genetic recombination (crossover) can also be applied to a pair of parents, at least one of which is selected from each population based on its relative fitness.

Note that this measurement of relative fitness for an individual in co-evolution is not an absolute measure of fitness against an optimal opponent, but merely a relatives measure when the individual is tested against the current opposing population (environmental population). If one population contains boxers who only throw left punches, then an individual whose defensive repertoire contains only defenses against left punches will have high relative fitness. But, this individual will have only mediocre absolute fitness when tested against an opponent who knows how to throw both left punches and right punches (the optimal opponent).

Over a period of time, both populations of individuals will tend to "co-evolve" and to rise to higher levels of performance as measured in terms of absolute fitness. Both populations do this without the aid of any externally supplied absolute fitness measure serving as the environment. In the limiting case, both populations of individuals can evolve to a level of performance that equals the absolute optimal fitness. Thus, the hierarchical co-evolution process is a self-organizing, mutually-bootstrapping process that is driven only by relative fitness (and not by absolute fitness). Note that although we present a co-evolution example wherein fitness is computed solely as a function of performance relative to an opposing population, the present invention does not preclude the use of a global environment as well.

Co-evolution is likely to be especially important in competitive situations (i.e. games) because one almost never has a priori access to an optimal strategy for either player. One therefore encounters a "chicken and egg" situation. In trying to develop an optimal strategy for the first player, one does not have the advantage of having an optimal second player against which to test candidate strategies. In checkers or chess, for example, it is difficult for a new player to learn to play well if he does not have the advantage of playing against a highly competent player.

Processing Logic of the Preferred Embodiment

Figure 3A:
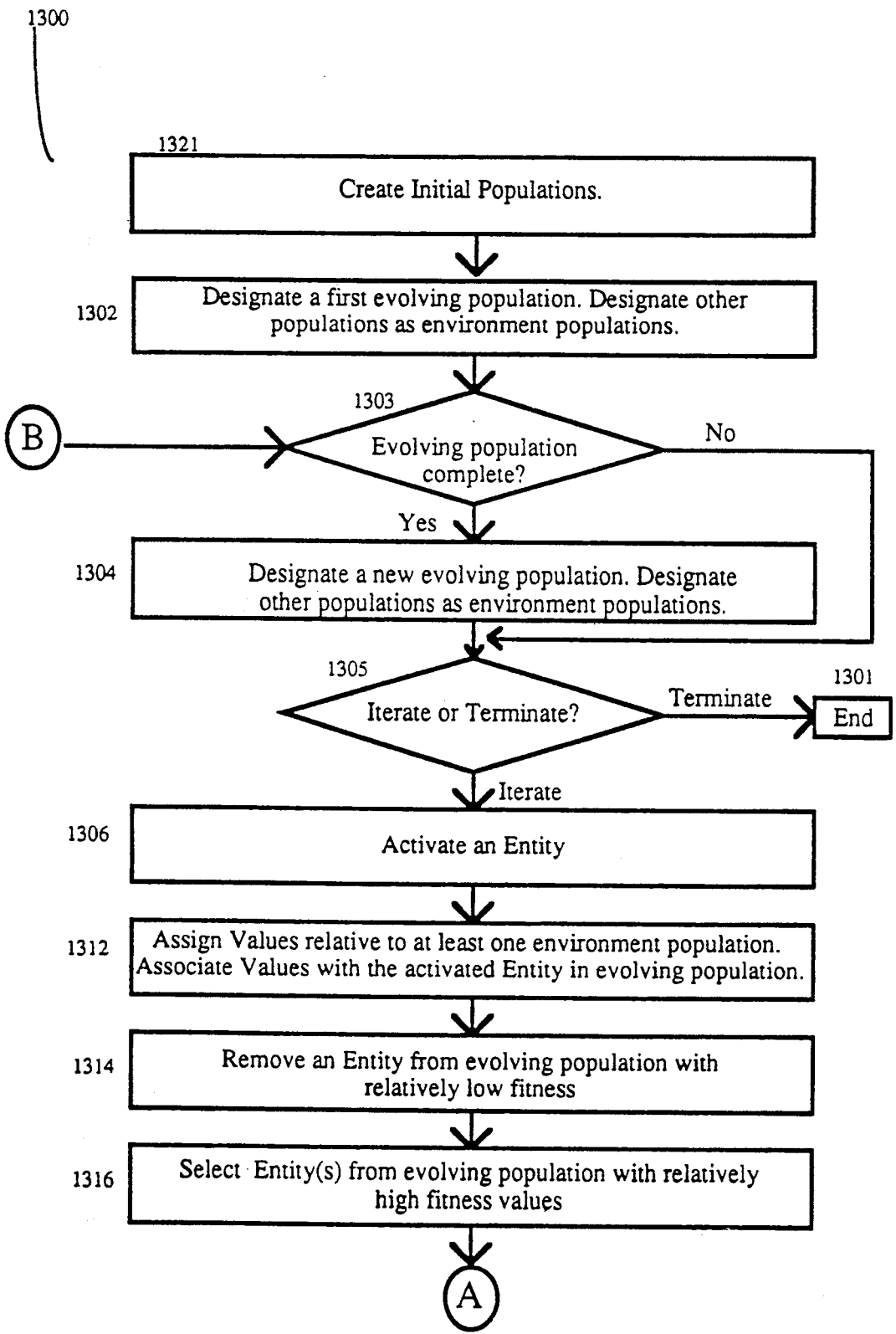
FIGS. 3A and 3B are flow chart diagrams of the present invention.
Figure 3B:
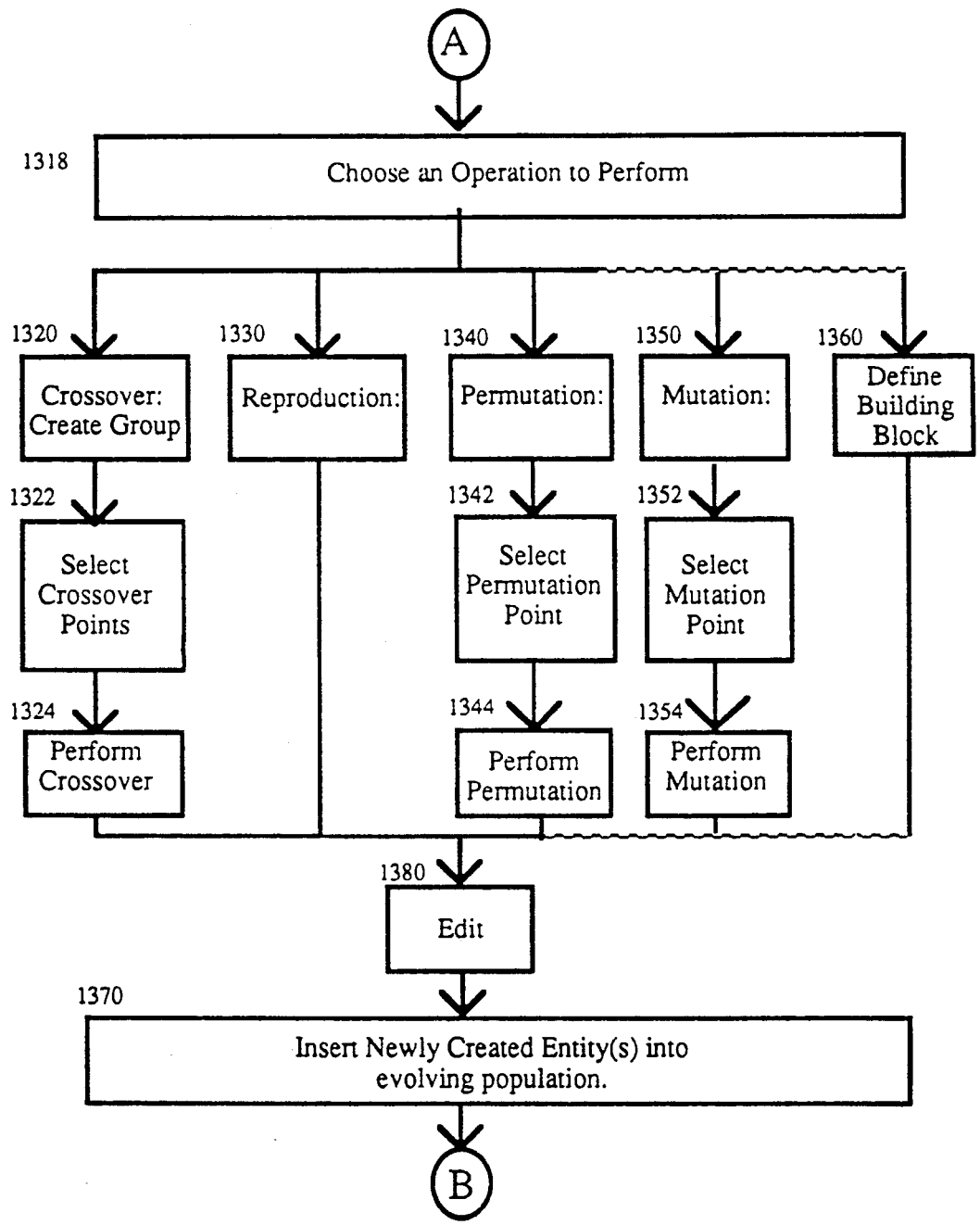

FIGS. 3A and 3B are flow charts of the processes of the present invention. The process 1300 starts by the step Create Initial Populations 1321 which creates (typically randomly) a number of populations containing a number of programs. One population is designated as an evolving population. The remaining populations are designated as environmental populations 1302. The process then begins to operate upon the designated evolving population. If processing is not complete for the designated evolving population 1303, control drops to decision box 1305 where a termination condition is tested. If the termination test is satisfied (for example, by achieving a known best solution to the problem among the population of individuals, by achieving a certain degree of fitness for the population, etc.), the process terminates at End 1301. Otherwise, the process continues to iterate. If processing for the evolving population is complete at decision box 1303, control drops to processing box 1304 where a new evolving population is designated. Processing then begins for the new evolving population at decision box 1305.

The basic iterative loop of the process for the evolving population begins with the step Execute Each Entity 1306 wherein at least one entity executes. The next step, Assign Values relative to environmental populations and Associate Values with each Entity 1312, involves assigning a value (fitness) to each result produced by execution, and associating the value with the producing entity. After assigning and associating, Remove Entity(s) with relatively low fitness, step 1314 causes the removal of some of the less fit members of the evolving population (the term "entity(s)" used herein refers to the phrase "entity or entities"). Although not essential, step 1314 improves the average fitness and eases memory requirements by keeping the evolving population within reasonable limits. Step 1316, Select Entity with relatively high fitness values, picks at least one entity to use in the following operation. The selected entity(s) have a relatively high fitness value.

Referring to FIG. 3B at step 1318, Choose an Operation to Perform, the process determines which operation to begin. Crossover 1320 and Reproduction 1330 are the basic operations performed; however, Permutation 1340 also plays a role. Optionally, the operation of Mutation 1350 or Define Building Blocks 1360 may be used. Typically, the vast majority of operations are the reproduction and crossover operations.

Note that the same individual may be selected more than once (i.e., replacement is allowed).

It should be recognized that there are numerous slight variations of the overall process possible. Some of these variations can be used as a matter of convenience.

Crossover 1320 requires a group of at least two entities (typically two parents), so second entity(s) are picked to mate with at least one selected entity(s). There are various methods for choosing the second parent or parents. Generally, choosing only relatively high fitness individuals is preferable over choosing randomly. Parents mate by matching selected entity(s) with at least one second picked entity(s). For each mating, a crossover point is separately selected at random from among both internal and external points within each parent at Select Crossover Points 1322. Then newly created entitys are produced at Perform Crossover 1324 from the mating group using crossover. Two parents would typically produce two offspring.

Note also no requirement exists that the evolving population be maintained at a constant size. The version of the crossover operation producing two offspring from two parents has the convenient attribute of maintaining the population at constant size. (Note that the other operations each produce one offspring from one parent so that they too maintain constant population size). On the other hand, if the crossover operation acts on a group of more than two parents, the size of the population may grow. For example, if three parents formed a mating group, each parent would have two crossover points selected for it and there would be 27 possible offspring ($3 \times 3 \times 3$). Even if the three offspring equivalent to the three original parents are excluded, there would be 24 possible new offsprings available. In general, if there are N parents, then $N-1$ crossover points would be selected for each and there would be $N^N - N$ new offspring available. When an operation produces more offspring than parents, then either the population can be allowed to grow or the population can be trimmed back to a desired (presumably constant) size when the next round of fitness proportionate reproduction takes place.

For the operation of Reproduction 1330, the Selected entity(s) remain unchanged. The preferred method for selecting computational procedures for reproduction is to select them with a probability proportional to their normalized fitness. It is also possible to use tournament selection or other methods of success.

If the permutation operation is selected then the process continues at Permutation 1340. A permutation point is selected at random in Select Permutation Point 1342 from among the internal points within the selected individual. Then Perform Permutation 1344 is performed, by reordering the selected entity's sub-procedures, parameters, or both at the permutation point.

If the mutation option is chosen, Mutation 1350 occurs. The location of the mutation is picked in Select Mutation Point 1352 for each Selected entity. Perform Mutation 1354 then randomly generates, for each Selected entity, a portion of an entity and inserts it at the mutation point. The portion inserted is typically a single point, but may be a sub-entity.

If the Define Building Block operation 1360 is chosen, a new function is defined by replacing the sub-tree located at the chosen point by a call to the newly defined function. The body of the newly defined function is the sub-tree located at the chosen point. The newly defined functions can be named DF0, DF1, DF2, DF3, ... as they are created.

The editing function 1380 recursively applies a pre-established set of editing rules to each S-expression in the population. In all problem domains, if any sub-expression has only constant atoms as arguments, the editing operation will evaluate that sub-expression and replace it with the value obtained. The "define building block" operation and editing function are described in more detail below.

Finally, the newly created entities are inserted into the evolving population at 1370 and the process returns to the termination test 1303.

The first step in the iterative process involves activating an entity from the evolving population. Activation means having the entity attempt to accomplish its goal, producing an objective result. In the preferred embodiment, entities are computer programs, so activation requires executing the programs of the population. The second step in the process assigns a fitness value to the objective result, and associates that fitness value with its corresponding entity. For computer programs, the fitness value is generally a number, or a vector, which reflects the program's execution, although the fitness value could be any symbolic, numeric or structured representation used on a computer, provided they can be ordered.

In general, some of the entities will prove to be better than others when a value is assigned to them after their interaction with the "environment" of the problem (i.e. the environmental populations and, possibly, the global environment). The best value (fitness) may be the lowest number (as is the case here where we are measuring the aggregated deviation between a result and a known perfect solution). In other problems, the best value (fitness) may be the highest number (e.g. scoring direct "hits"). The value (fitness) assigned may be a single numerical value or a vector of values, although it is often more convenient that it be a single numerical value. In many problems, the best value is not known. However, even in such problems, it is known whether lower (or higher) numbers connote better fitness and the best value attained by the process at a given time can be identified.

A useful method for organizing raw fitness values involves normalizing the raw values, then calculating probabilities based on the normalized values. The best raw fitness value is assigned an adjusted fitness of 1, the worst value is assigned an adjusted value of 0, and all intermediate raw values are assigned adjusted values in the range of 0 to 1. The probability of an individual being selected can be determined in one of several ways. One way is that the probability of being selected is determined by the equation:

$$P(i) = \frac{f_i}{\sum_{j=1}^{n} f_j}$$

Where P(i) is the probability of selection for individual i having an adjusted fitness of $f_i$, and n is the total number of the population. Thus, an individual's probability of being selected equals the individual's adjusted fitness value divided by the sum of all the adjusted fitness values of the population. In this way, the normalized fitness values range P (i) between 0 and 1, with a value of 1 associated with the best fitness and a value of 0 associated with the worst, and the sum of all the probabilities equals 1. Note that fitness proportionate reproduction requires activation of all the entities in the evolving population in order to compute the sum of the adjusted fitness values $f_j$ needed in the above calculation.

Another way of selecting an individual is called "tournament selection". In tournament selection, two individuals are randomly selected from the population; their fitness is compared; and, the better of the two individuals is selected. This "tournament" method of selection requires less computer time and does not require the centralized computation of the sum of the adjusted fitness values $f_j$. In effect, this method relies upon the relative ranking of the fitness values, rather than their exact numeric values.

However, if computer time and the centralized computation is not a concern, the "fitness proportionate reproduction" method is generally to be preferred.

It may also be desirable to remove individual computation procedures from the evolving population with relatively poor fitness values. In practice, it may also be convenient to defer this activity briefly until a new generation of individuals is created.

It is a key characteristic of this overall process that the new populations of individuals tends to display, over a period of time, increasing average value (fitness) in the environment involved. Moreover, another characteristic of this overall process is that if the environment changes, the new populations of individuals will also tend to display, over a period of time, increasing average value (fitness) in the new environment involved.

At any given time, there is one individual (or more) in every finite population having a single fitness value that is the best amongst that population. Moreover, some environments have a known best fitness value. Examples are when fitness is measured as deviation from a known answer (e.g. a linear equations problem) or number of matches (e.g. a sequence induction problem). Alternatively, a mixed strategy may be used in determining fitness wherein a mix of pure strategies is used instead of a pure optimum strategy.

The present invention's process may occassionally generate an individual whose value (fitness) happens to equal the known best value. Thus, this overall process can produce the best solution to a particular problem. This is an important characteristic of the overall process, but it is only one characteristic. Another important characteristic (and the one which is more closely analogous to nature) is that a population of individuals exists and is maintained which collectively exhibits a tendency to increase their value (fitness) over a period of time. Also, by virtue of the many individuals with good, but not the very best, fitness values the population exhibits the ability to robustly and relatively quickly deal with changes in the environment. Thus, the variety in the population lowers its overall average value (fitness); additionally, the population's variety gives the population an ability to robustly adapt to changes in the environment.

In executing the overall process, it is often convenient to mark the one (or perhaps more) individuals in the population with the best fitness value amongst that population at any given time. Such marked best individuals are then not subject to removal (as parents), but are instead retained in the population from generation to generation as long as they remain the best. This approach prevents loss of the most fit individual in the population and also provides a convenient reference point for analytical purposes. If the problem involved happens to have a known best solution, after a certain number of generations the best individual will often be the known best solution.

The third step involves selecting entities which will be used to perform operations. A number of selection methods exist which tend to select entities of relatively high value. The theoretically most attractive way to select individuals in the population is to do so with a probability proportionate to their fitness values (once so normalized between 0 and 1). Thus, an individual with fitness of 0.95 has 19 times greater chance of being selected than an individual of fitness value 0.05. Occasionally individuals with relatively low fitness values will be selected. This selection will be appropriately rare, but it will occur.

If the distribution of normalized fitness values is reasonably flat, this method is especially workable. However, if the fitness values are heavily skewed (perhaps with most lying near 1.00), then making the selection using a probability that is simply proportionate to normalized fitness will result in the differential advantage of the most fit individuals in the population being relatively small and the operation of the entire process being prolonged. Thus, as a practical matter, selection is done with equal probability among those individuals with relatively high fitness values rather than being made with probability strictly proportionate to normalized fitness. This is typically accomplished by choosing individuals whose fitness lies outside some threshold value. One implementation of this approach is to select a threshold as some number of standard deviations from the mean (selecting for example, all individuals whose fitness is one standard deviation from the mean fitness).

In connection with selection of individuals on the basis of fitness, we use the phrase "relatively high value" herein to connote either selection based on a probability proportionate to normalized fitness (the preferred approach), tournament selection (the time-saving approach), or selection with equal probability among those individuals having fitness values outside some threshold. In practice, choosing individuals from the best half with equal probability is a simple and practical approach, although fitness proportionate selection is the most justified theoretically.

After completing selection, the fourth step requires choosing an operation. The possible operations include crossover, permutation, and reproduction. In addition, mutation and "define building block" operations are available. The preferred operation is crossover, followed by reproduction, and lastly permutation. However, this preference is only a generalization, different preferences may work better with some specific examples. Thus the choice of operations should mainly be the preferred operation; but that choice should remain flexible to allow for solving differing problems.

As will be seen below, the key operation for introducing new individuals into the population is the crossover operation. To illustrate the crossover operation for this example, a group of two individuals is selected from among the population of individual S-expressions having relatively high fitness values, although, it is not necessary to limit the size of the group selected to two. Two is the most familiar case since it is suggestive of sexual reproduction involving a male parent and a female parent. The underlying mathematical process can obtain effective results by "crossing" hereditary information from three or more parents at one time. However, the key advantage of being able to combine traits from different individuals is attained with two parents. In its preferred form, all of the individuals in the group of parents have relatively high fitness values. In its most general form, the requirement is only that at least one of the individuals in the group of parents has a relatively high fitness value. The other parents in the group could be any member of the population. In either case, all mating involves at least one parent with relatively high fitness values.

Figure 4:
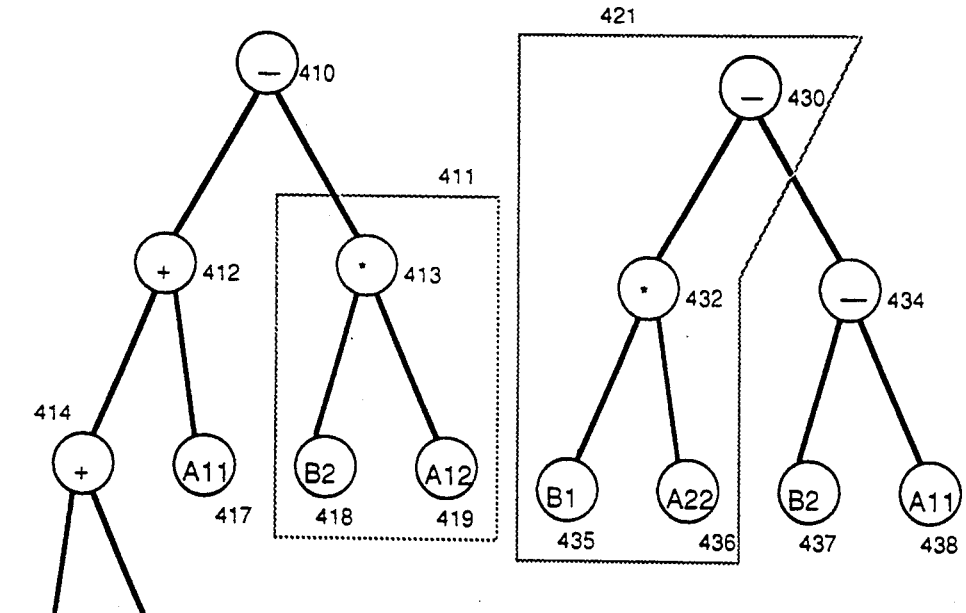
FIG. 4 is a tree diagram representation of a crossover operation occurring at internal points.
Figure 4:
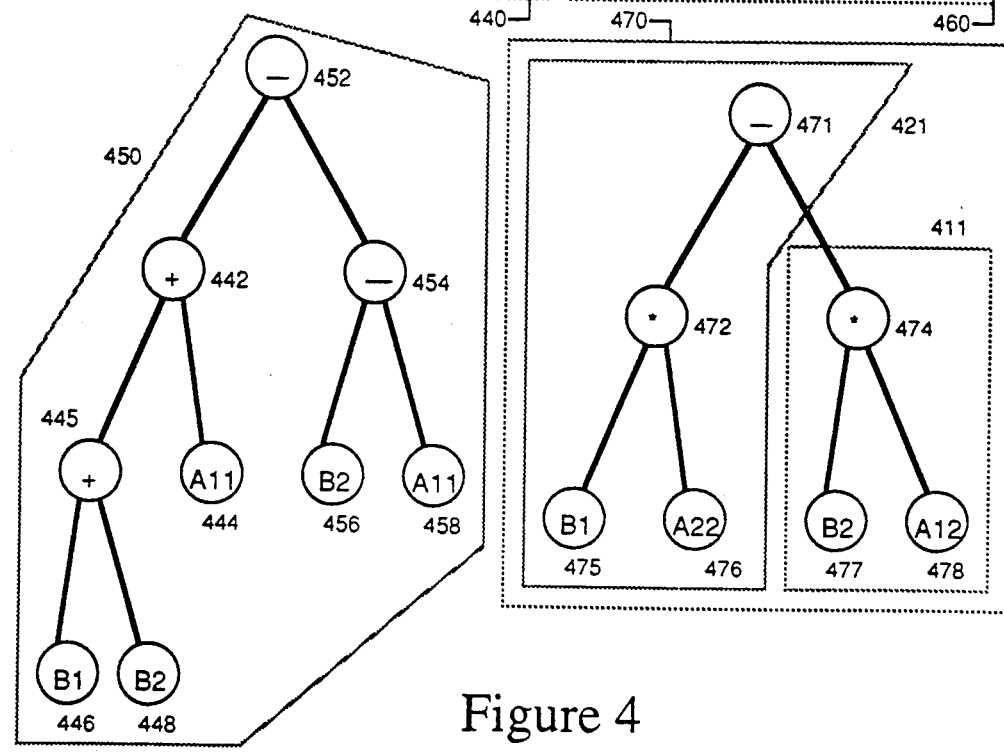

For purposes of this example problem, assume that a group of two parents with relatively high fitness values has been selected. The group of parents is now used to create two new individuals. FIG. 4 graphically illustrates a simple example of mating two parents to produce two new offspring for the example problem involving linear equations. It should be noted that there need not be precisely two offspring and some versions of the basic concept here produce only one offspring (or can produce more than two offspring).

Parent 1 is the computational procedure 400:

$$(-(+(+B1\ B2)A11)(*B2\ A12))$$

This computational procedure can also be represented by the rooted point-labeled tree with root 410. Root 410 is the subtraction function and has lines to two arguments, internal nodes 412 and 413. Node 412 is the addition function having lines to internal node 414 and leaf 417 (the variable A11), its arguments. Node 414 is the addition function having lines to leafs 415 and 416 (the variables B1 and B2, respectively). The root 410's second argument, node 413, is the multiplication function having lines to leafs 418 and 419 (the variables B2 and A12, respectively), its two arguments. Sub-tree 411 comprises 413, 418, and 419. Parent 2 is the computational procedure 420, $(-(*\ B1\ A22)(-B2\ A11))$. This computational procedure can also be represented as the rooted point-labeled tree with root 430. Root 430 is the subtraction function and has lines to two arguments, internal node 432 and 434. Node 432 is the multiplication function having lines to arguments at leafs 435 and 436 (the variables B1 and A22, respectively). Node 434 is the subtraction function having lines to arguments at leafs 437 and 438 (the variables B2 and A11, respectively). Tree 421 comprises 430, 432, 435 and 436, which is all of parent 2 except for the root 430's second argument.

Selecting the crossover point starts by counting up the internal and external points of the tree. The tree with root 410 has 9 points (410, 412, 413, 414, 415, 416, 417, 418, and 419). One of the 9 points (410, 412, 413, 414, 415, 416, 417, 418 and 419) of the tree for parent 1 (that is, the tree with root 410) is chosen at random as the crossover point for parent 1. A uniform probability distribution is used (so that each point has a probability of 1/9 of being selected). In this figure, point 413 is chosen. Point 413 happens to be an internal point of the tree.

Similarly, one of the 7 points (430, 432, 434, 435, 436, 437 and 438) of the tree for parent 2 (that is, the tree with root 430) is chosen at random as the crossover point for parent 2. In this figure, point 434 is chosen. Point 434 happens to be an internal point of the tree. Each of the 7 points has a uniform probability of 1/7 of being chosen.

Offspring 2 is produced by combining some of the traits of parent 1 and some of the traits of parent 2. In particular, offspring 2 is produced by substituting the sub-tree 411 (sub-procedure), beginning at the selected crossover point 413 [namely, (* B2 A12)] of parent 1, into the tree 421 of parent 2 at the selected crossover point 434 of parent 2. The resulting offspring 470 thus contains the sub-procedure 411 (* B2 A12) from parent 1 as a sub-procedure at point 474, which is attached to the second line from root 430 of tree 421. It is otherwise like parent 2 [that is, it has a root labeled with the subtraction function having (* B1 A22) as its first argument]. This particular mating produces the computational procedure 460, (−(* B1 A22)(* B2 A12)), which is the known correct solution for the first variable x1 for a pair of two linear equations in two variables. In other words, the crossover involving parents 1 and 2 (neither of which were the correct solution to the linear equations problem) using the crossover points 413 and 434 happened to produce an offspring with best fitness (i.e. the known correct solution to the problem).

Offspring 1 is produced in a similar fashion by combining some of the traits of parent 1 and some of the traits of parent 2. In this case, the complementary portions of each parent combine. In particular, offspring 1 is produced by substituting the sub-tree (sub-procedure) beginning at the crossover point 434, ((−B2 A11)] of parent 2, into the tree of parent 1 at the crossover point 413 of parent 1. The resulting offspring 450 thus contains the sub-procedure (−B2 A11) from parent 2 as a sub-procedure at point 454. It is otherwise similar to parent 1. Root 452 is the subtraction function having lines to arguments at internal nodes 442 and 454. Node 442 is the addition function having lines to arguments at internal node 445 and leaf 444 (the variable A11). Internal node 445 is the addition function having lines to arguments at leafs 446 and 448 (the variables B1 and B2, respectively). Node 454 is the subtraction function having lines to arguments at leafs 456 and 458 (the variables B2 and A11, respectively).

Figure 5:
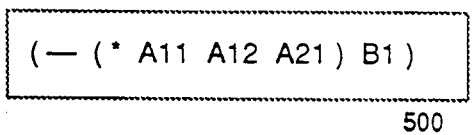
FIG. 5 is a tree diagram representation of a crossover operation occurring at external points.
Figure 5:
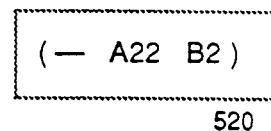
Figure 5:
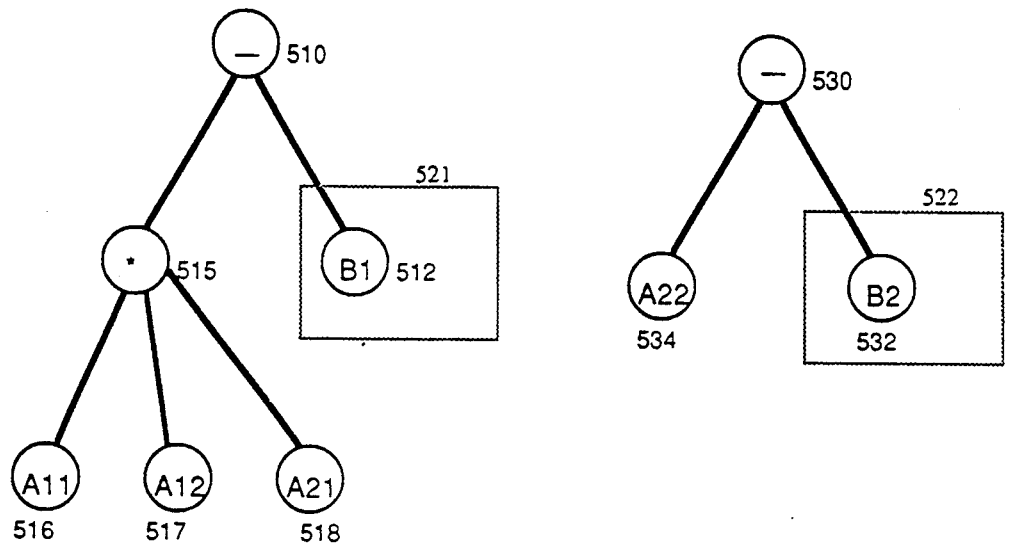
Figure 5:
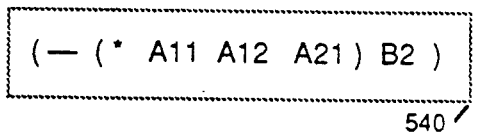
Figure 5:
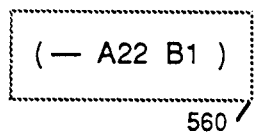
Figure 5:
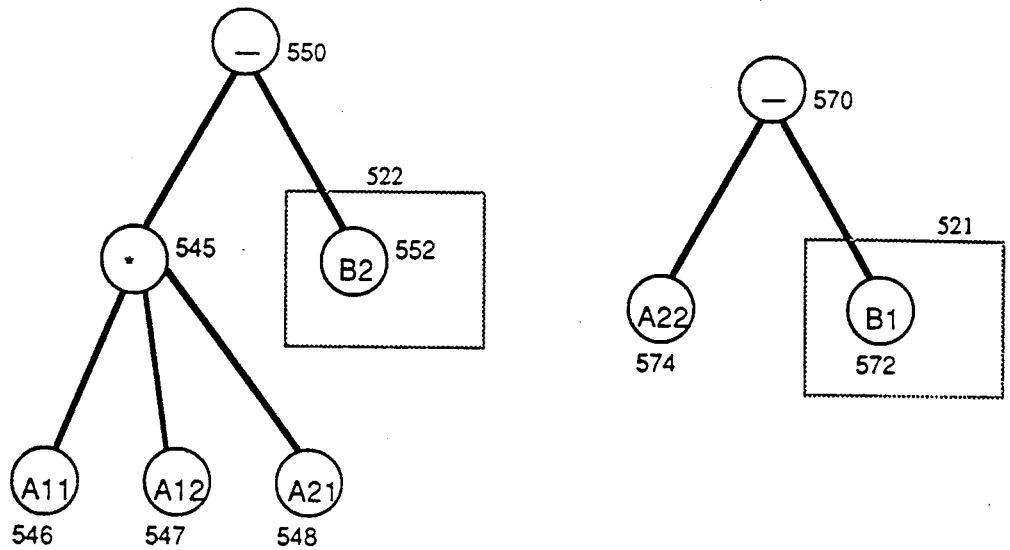

If two external points (leafs) of the tree had been chosen as crossover points, the crossover would have proceeded similarly with the labels (i.e. arguments) for the two points being exchanged. FIG. 5 illustrates the mating of two parents with crossover occurring only at external points (leafs) for the linear equations example problem. The first parent 500, (−(* A11 A12 A21)B1), is represented by the tree with root 510. Root 510 is the subtraction function having lines to arguments at internal node 515 and leaf 512 (the variable B1). Node 515 is the multiplication function having lines to arguments at leafs 516, 517, and 518 (the variables A11, A12, and A21, respectively). External point (leaf) 512 has been chosen as the crossover point for the first parent and contains the atomic argument of the variable B1. Note that, for purposes of illustrating the generality of functions, one of the functions (*) has 3 arguments (A11, A12 and A21) in this particular figure. The second parent 520 is represented by the tree with root 530. Root 530 is the subtraction function having lines to arguments at leafs 534 and 532 (the variables A22 and B2, respectively). External point (leaf) 532 has been chosen as the crossover point for the second parent and contains the atomic argument B2.

The result of the crossover operation is two new offspring 540 and 560. The first offspring 540, (−(* A11 A12 A21) B2), is represented by the tree with root 550. Root 550 is the substraction function having lines to arguments at internal node 545 and leaf 552 (the variable B2). Node 545 is the multiplication function having lines to arguments at leafs 546, 547, and 548 (the variables A11, A12, and A21, respectively). This tree is identical to the tree with root 510 (i.e. parent 1) except that external point (leaf) 552 is now the argument B2 (instead of B1) from parent 2. The second offspring 560, (−A22 B1), is represented by the tree with root 570. Root 570 is the subtraction function having lines to arguments at leafs 574 and 572 (the variables A22 and B1, respectively). This tree is identical to the tree with root 530 (i.e. parent 2) except that external point (leaf) 572 is now the argument B1 (instead of B2) from parent 1. Thus, the arguments B1 and B2 have been crossed over (exchanged) to produce the two offspring.

Figure 6:
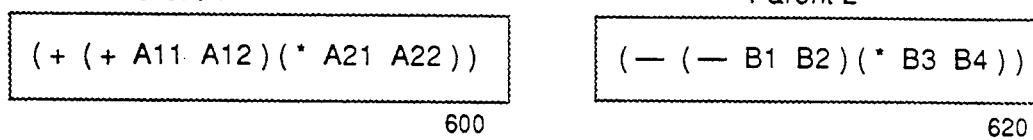
FIG. 6 is a tree diagram representation of a crossover operation occurring at an internal and an external point.
Figure 6:
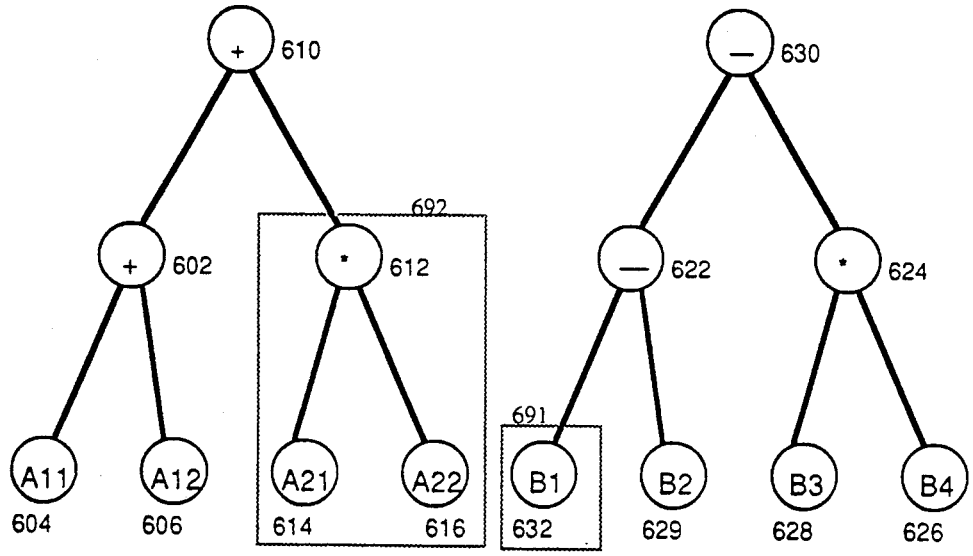
Figure 6:
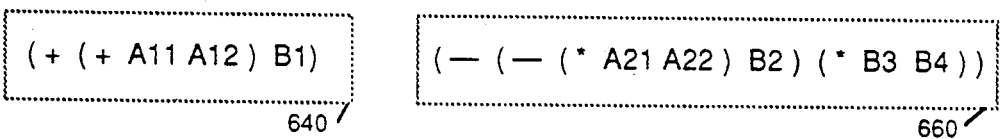
Figure 6:
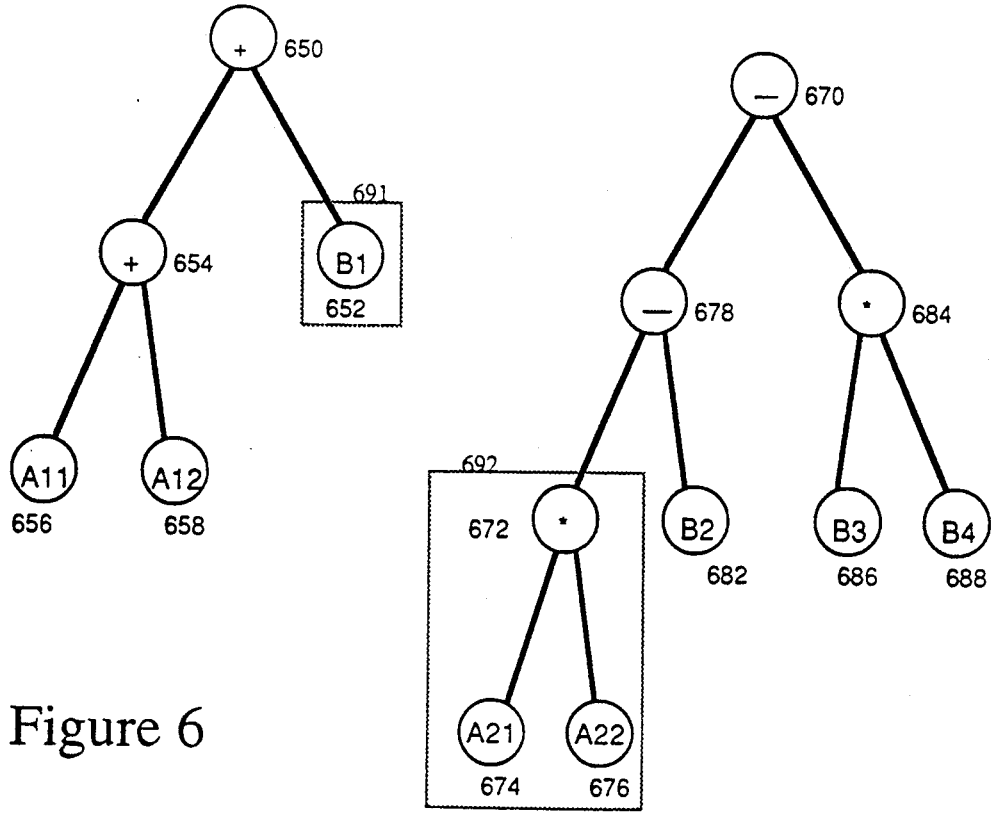

FIG. 6 illustrates the mating of two parents with crossover occurring at one internal point (i.e. a point labeled with a function) and one external point (i.e. a point labeled with an atomic argument). The first parent 600, (+(+A11 A12) (* A21 A22)), is represented by a tree with root 610. Root 610 is the addition function having lines to arguments at internal nodes 602 and 612. Node 602 is the addition function having lines to arguments at leafs 604 and 606 (the variables A11 and A12, respectively). Node 612 is the multiplication function having lines to arguments at leafs 614 and 616 (the variables A21 and A22, respectively). Internal point 612 has been chosen as the crossover point for the first parent. The second parent 620, (−(−B1 B2) (* B3 B4)), is represented by a tree with root 630. Root is the subtraction function having lines to arguments at internal nodes 622 and 624. Node 622 is the subtraction function having lines to arguments at leafs 632 and 629 (the variables B1 and B2, respectively). Node 624 is the multiplication function having lines to arguments at 628 and 626 (the variables B3 and B4, respectively). External point 632 has been chosen as the crossover point for the second parent.

The result of the crossover operation is two new offspring. The first offspring 640, (+(+A11 A12) B1), is represented by the tree tree with root 650. Root 650 is the addition function having lines to arguments at internal node 654 and leaf 652 (the variable B1). Node 654 is the addition function having lines to arguments at leafs 656 and 658 (the variables A11 and A12, respectively). This tree.is identical to the tree with root 610 (i.e. parent 1) except that the second argument of the function +(addition) 652 is now the single argument (atom) B1 from parent 2. The second offspring 660, (−(−(* A21 A22) B2) (* B3 B4)), is represented by the tree with root 670. Root 670 is the subtraction function having lines to arguments at internal nodes 678 and 684. Node 678 is the subtraction function having lines to arguments at internal node 672 and leaf 682 (the variable B2). Node 672 is the multiplication function having lines to arguments at leafs 674 and 676 (the variables A21 and A22, respectively). Node 684 is the multiplication function having lines to arguments at leafs 686 and 688 (the variables B3 and B4, respectively). This tree is identical to the tree with root 630 (i.e. parent 2) except that the internal point 672 (i.e. the first argument of the subtraction function 678) is now a function (multiplication) instead of the atomic argument of the variable B1.

Thus, regardless of whether internal or external points are selected as crossover points on the trees of the parents, the result of the crossover operation is that offspring are produced which contain the traits of the parents. In fact, the offspring resulting from crossover consist only of sub-procedures from their parents. To the extent this is not entirely the case in actual practice, the result can be viewed as having been the result of applying crossover to the parents and then allowing a mutation (random variation) to occur. The crossover operation has the properties of closure and being well-defined.

Occasionally, a given individual may be mated with itself. In the conventional genetic algorithm involving binary strings, crossover with identical parents merely creates two copies of the original individual. When computational procedures are involved, an individual mating with itself generally produces two different individuals (unless the crossover points selected happen to be the same).

The three examples of mating with crossover were presented above in terms of the graphical representation of the computational procedures. Graphical representations are especially suited to demonstrating the "cut and paste" character of the crossover operation. In addition, the graphical method of representation is a general way of representing functions and the objects they operate on (whether computational procedures or machines) and is also not inherently associated with any particular programming language or any particular mode of implementation. As previously discussed, the computer language LISP is preferred for actually implementing these processes on a computer.

In FIG. 6, the mating of two parents with crossover occurring at one internal point and one external point is illustrated. FIG. 6 will be referred to in the following discussion since it encompasses the principles involved in both FIGS. 4 and 5. Parent 1 in FIG. 6 was the LISP computational procedure (+(+A11 A12) (* A21 A22)) and parent 2 in FIG. 6 was the LISP computational procedure (−(−B1 B2) (* B3 B4)). Using LISP computational procedures, the mating of the two parents is implemented in the following way.

First, the number of functions and atomic arguments in the LISP S-expression 600 in FIG. 6 are counted. For LISP S-expression 600, there are 3 functions (i.e. 2 occurrences of + and 1 occurrence of *) and there are 4 atomic arguments (i.e. A11, A12, and A22). The total count is 7. This counting can be easily performed in LISP in a variety of well-known ways. One especially simple way makes use of such basic LISP functions as CAR and CDR, which are built into the microcode of microprocessor chips that are especially designed to handle LISP (such as found in the Texas Instruments Explorer II computer). The CAR function in LISP allows one to examine the first item of any list. Here the first item in computational procedure 600 is the first + function (i.e. the addition function appearing just inside the outermost left parenthesis). The "+" is identified as a function and included in the overall count. Meanwhile, the CDR function eliminates the first item of the list by returning a list comprising all but the first item. Thus, the remainder of the computational procedure (which is now smaller than the original computational procedure 600 by the first element +) can be subjected to similar handling in a recursive way.

Secondly, having counted the number of functions and atomic arguments in the computational procedure 600, a random number generator is called to select a number between 1 and 7. Typically, a uniform probability distribution (i.e. probability of 1/7 for each of the 7 possibilities is used). Such random number generators are well-known in the art and often included in a package of utility functions provided by computer manufacturers to users of their computers. Texas Instruments provides a random number generator for generating a random integer within certain bounds using a uniform probability distribution. If the random number generator selects the integer 5, then the multiplication function * (shown graphically at point 612) would be chosen as the crossover point for parent 1. This identification is most simply accomplished by numbering the functions and atomic arguments in the same order as the counting function encountered them (although any ordering might be used for this purpose). In particular, the crossover point is the first element of the sub-list (* A21 A22). This sub-list is the third element of the list 600. Note that in LISP, a computational procedure is represented by a list—an ordered set of items found inside a pair of parentheses.

Similarly, the functions and atomic arguments in computational procedure 620 can be counted. The count for parent 2 would thus also be 7. In this example, the atomic argument B1 is selected as the crossover point for parent 2. This atomic argument happens to be in the second top-level element of the list 620—namely, the sub-list (−B1 B2). In fact, B1 is the second element of this second top-level element of list 620.

The third step involves finding the "crossover fragment" for each parent. When the crossover point for a given parent is an atomic argument, then the "crossover fragment" for that parent is simply the atomic argument. Thus, for example, the crossover fragment for parent 2 is the atom B1. On the other hand, when the crossover point for a given parent is a function, then the "crossover fragment" for that parent is the entire list of which the function is the first element. Thus, for example, the crossover fragment for parent 1 is the entire list 692, which is (* A21 A22). By producing a "crossover fragment", portions of each parent combine to produce offspring.

In the above case, the "crossover fragment" list has no sub-lists. However, if this list contained a sub-list (that is, an argument that was itself a function of other arguments), then it is carried along also. This point about sub-lists can be easily illustrated by supposing that the first element of list 600 had been chosen as the crossover point (instead of the multiplication * function). This first element is the function +. Then the crossover fragment associated with this crossover point is the entire original list 600—that is, the list consisting of the function + and the 2 sub-lists (+A11 A12) and (* A21 A22).

The fourth step is to produce offspring 1. Offspring 1 is produced by allowing parent 1 to perform the role of the "base" ("female") parent and parent 2 to perform the role of the "impregnating" ("male") parent. In general, an offspring is produced within the female parent by replacing the crossover fragment of female parent with the crossover fragment of the male parent. In particular, the crossover fragment 692 of the female parent [the entire list (* A21 A22)] is replaced within the female parent by the crossover fragment 691 of the male parent (the atomic argument B1). The resulting offspring 1 (640) is:

(+(+A11 A12) B1).

The fifth step is to produce offspring 2. Offspring 2 is produced by allowing parent 2 to perform the role of the "base" ("female") parent and parent 1 to perform the role of the "impregnating" ("male") parent. In particular, the crossover fragment 691 of the female parent (the atomic argument B1) is replaced by the crossover fragment 692 of the male parent, which is the list (* A21 A22). The resulting offspring 2 (660) is thus: (−(−(* A21 A22) B2) (* B3 B4).

Thus, two parents can produce two offspring. In some variations of the process, only one offspring is produced from a designated male-female pair; however, it is most convenient to have two parents produce two offspring (since, among other things, this produces the convenient, although not necessary, side effect of maintaining the population size at a constant level). In this preferred implementation of the crossover process, each offspring is composed of genetic material that came from either its male parent or its female parent. The genetic material of both parents finds its way into each one of the two offspring.

For the operation of reproduction, one computational procedure with relatively high fitness is selected from among the computational procedures in the population. This computational procedure is retained in the population unchanged. The preferred method for selecting computational procedures for reproduction is to select them with a probability proportional to their normalized fitness. In other words, there is survival and reproduction of the fittest amongst the computational procedures in the population. One consequence of the reproduction operation is that individuals in the population with relatively low fitness values are progressively removed from the population.

It should be noted that the reproduction operation introduces nothing new into the population. If only reproduction operations were performed, no new individuals would be created. In fact, if only reproduction occurred, there would be progressively fewer and fewer different individuals in the population (although the average fitness of the population would tend to increase). The reproduction operation has the properties of closure and being well-defined.

Figure 7:
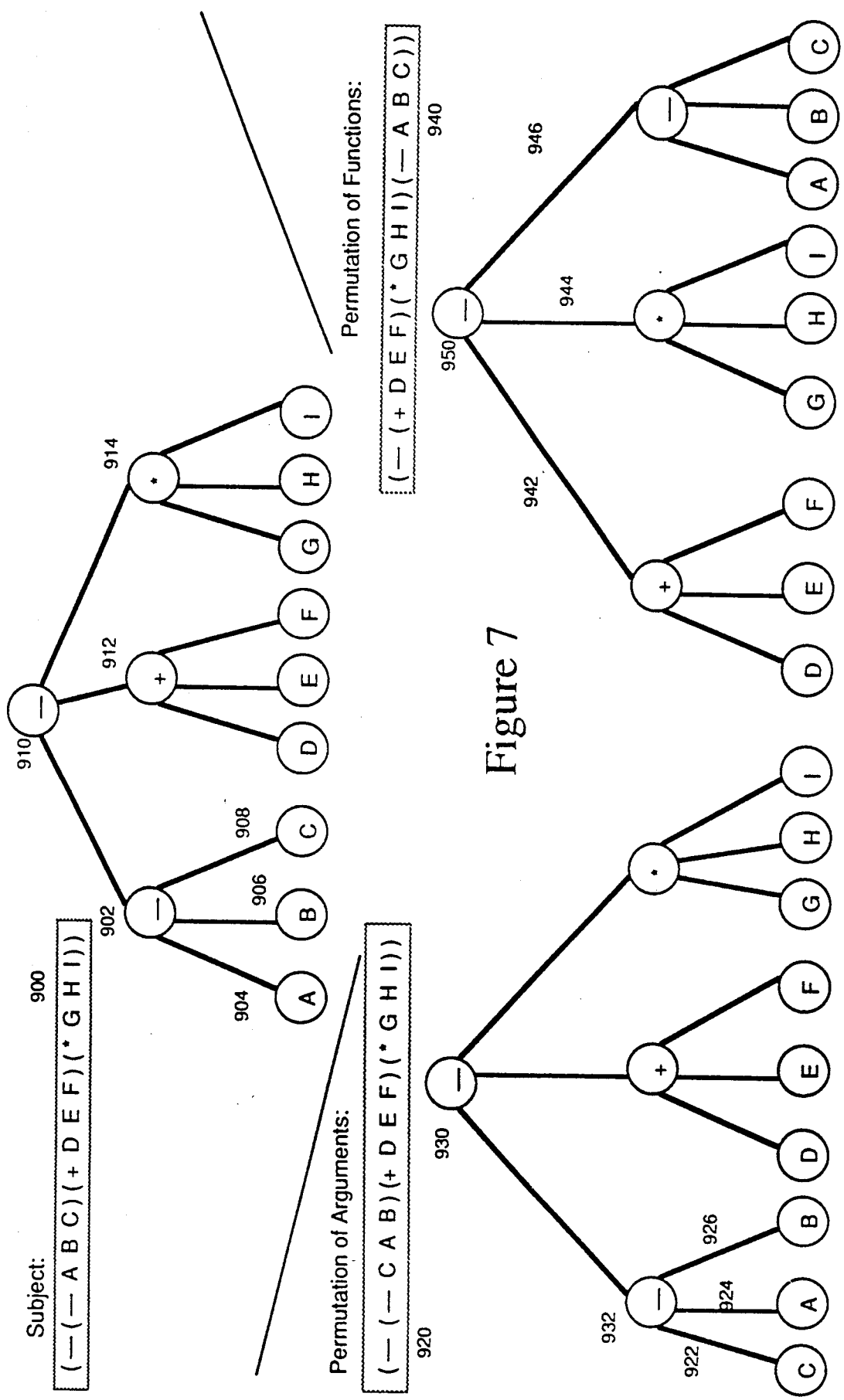
FIG. 7 is a tree diagram representation of a permutation operation.

Reproduction of the fittest and crossover are the basic operations for varying and improving the population of individual computational procedures. In addition, there is a permutation operation. Permutation operates on a single subject and produces a single computational procedure. The permutation operation has the properties of closure and being well-defined. FIG. 7 illustrates the permutation operation on a computational procedure.

The permutation operation is also performed on an individual in the population with relatively good fitness. One purpose of permutation is to introduce a new order among existing sub-procedures of a given computational procedure (possibly allowing some new possibility for adaptation to emerge). However, the chances of this happening are relatively remote (just as the chance of a random mutation producing a mutant with high fitness is remote). The most important purpose of permutation is, however, to improve various sub-procedures within a given computational procedure already having high fitness. Potentially, a new order for existing sub-procedures within a computational procedure already having high fitness will be less subject to disruption due to the action of the crossover operation.

In FIG. 7, the subject computational procedure 900, (−(−A B C) (+D E F) (* G H I)), is represented by a tree with root 910. Root 910 is the subtraction function and has lines to arguments at internal nodes 902, 912 and 914. Node 902 is the subtraction function and has lines to arguments at leafs 904, 906 and 908 (the variables A, B, and C, respectively). Node 912 is the addition function and has lines to arguments at leafs with the variables D, E, and F. Node 914 is the multiplication function and has lines to arguments at leafs with the variables G, H, and I.

Only internal points are selected for the permutation operation. To accomplish this, the internal points are counted and one of them is chosen at random from among the possibilities (typically using a uniform probability distribution). The tree with root 910 has four internal points (910, 902, 912, and 914). Once the permutation point is chosen, all the lines radiating downwards from that point are permuted (i.e. re-ordered) at random. If there are K lines radiating from a given permutation point, then there are K-factorial possible permutations. Thus, if K is 3 (as it is for internal point 902), then there are six possible permutations (i.e. 3 times 2 times 1) possible at the permutation point 902.

One of the six possible permutations is chosen at random using a uniform probability distribution over the six possibilities. One of the six possible permutations of three items permutes the items A, B, C to C, A, B. Suppose this one was chosen. The computational procedure 920, (−(−C A B) (+D E F) (* G H I)), is represented by the tree with root 930; it is the tree that results when this particular permutation is applied to the tree with root 910 using the permutation point 902. In this new tree 930, the first line 922 radiating from the internal point 932 ends with the label C (instead of A as at 904). The second line 924 radiating from internal point 932 ends with the label A (instead of B as at 906). The third line 926 radiating from internal point 932 ends with label B (instead of C as at 908). The second and third lines from 930 have the same arguments as the second and third lines from root 910. Thus, the permutation of A,B,C to C,A,B at permutation point 902 has been effected. If a particular permutation happens to exactly reverse the order of items, it is called an inversion.

If internal point 910 had been chosen as the permutation point, the computational procedure 940, (−(+D E F) (* G H I) (−A B C)), represented by the tree having root 950 could be the result. In this tree, the first line 942 radiating downwards from root 950 ends with the label + (addition). The second line 944 radiating downwards from internal point 950 ends with the label * (multiplication). The third line 946 radiating downwards from internal point 950 ends with the label − (subtraction). Thus, the three items −, +, * from tree 910 are permuted into the new order +, *, −. Each function has the same arguments as in the corresponding sub-tree from the tree with root 910. If one views the permutation operation as operating on the lines radiating downwards from the chosen point of permutation, there is no fundamental difference between the permutation of arguments illustrated by 920 and the permutation of functions illustrated by 940. The two are included here for the sake of illustration.

Another possible step in the present invention's process is mutation. The mutation operation alters a randomly selected point within an individual. It has the properties of closure and being well defined. Mutation, if performed at all, is performed on only a tiny fraction of allels in a tiny fraction of entities in the population. It is preferably performed on randomly selected individuals in the population having a relatively high fitness. The purpose of mutation is not to accidently create a mutant individual with extremely high fitness and thereby improve the population (although there is a very remote possibility that this may happen). Mutation does, however, perform one role which is occasionally useful—namely, it provides a way to introduce (or reintroduce) new genetic material into the population.

Generally, with even a modestly sized population, all the possible gene values (alleles) will be represented somewhere in the population. This is almost certainly going to be the case in the initial population if it is at least modestly sized and if it is generated at random. In fact, a potential pitfall of priming an initial population with good individuals (especially if 100% of the initial population comes from priming) is the possibility of accidently limiting the search possibilities to only a portion of the potential search space. However, in the course of removing individuals with low fitness, there is a remote possibility that particular alleles may actually disappear completely from a population. There is also a remote possibility that later, the vanished alleles may become necessary to achieve the next level of advance in fitness. To forestall this remote conjunction of possibilities, the mutation operation may prove useful. By randomly altering an allele in a tiny number of randomly chosen individuals from time to time, the mutation operation may reintroduce a vanished allele back into a population.

The "define building block" operation is a means for automatically identifying potentially useful "building blocks" while the process is running. The "define building block" operation is an asexual operation in that it operates on only one parental S-expression. The individual is selected in a manner proportional to normalized fitness. The operation selects a function (internal) point of the LISP S-expression at random. The result of this operation is one offspring S-expression and one new definition. The "define building block" operation defines a new function and by replacing the sub-tree located at the chosen point by a call to the newly defined function. The body of the newly defined function is the sub-tree located at the chosen point. The newly defined functions are named DF0, DF1, DF2, DF3, ... as they are created.

For the first occasion when a new function is defined on a given run, "(DF0)" is inserted at the point selected in the LISP S-expression. The newly defined function may then be compiled to improve efficiency. The function set of the problem is then augmented to include the new function so that, if mutation is being used, the arbitrary new sub-tree grown at the selected point might include a call to the newly defined function.

Figure 12:
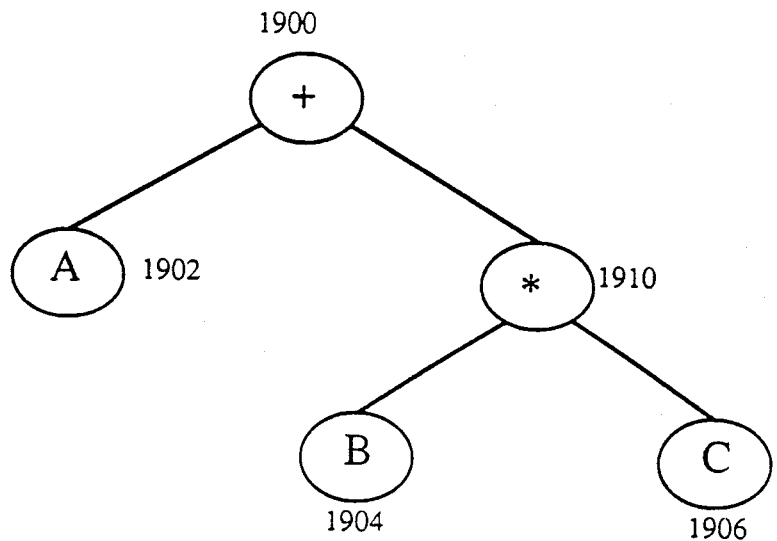
FIG. 12 illustrates a simple entity, namely the symbolic expression in the LISP programming language for the mathematical expression A+B*C.

FIG. 12 shows a simple entity, namely the symbolic expression in the LISP programming language for the mathematical expression A +B * C. In LISP, this mathematical expression would be written as (+A (* B C)). The figure shows the graphical representation of this LISP symbolic expression, namely the tree with root 1900.

Figure 13:
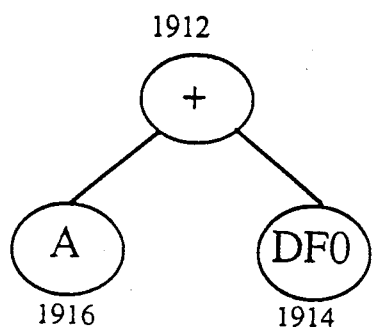
FIG. 13 illustrates the simple entity in FIG. 12 after application of the "Define Building Block" operation.

The "define building blocks" operation works by first selecting a point using a probability distribution. Suppose that the point 1910 is selected. The sub-tree (sub-expression, sub-list) starting at point 1910 is then replaced by a call to the function DF0. The function in FIG. 12 has no explicit arguments. Thus, the tree with root 1900 is replaced by the tree with root 1912, as shown in FIG. 13. The new tree has the function (DF0) at point 1914, in lieu of the sub-tree starting at 1910. In LISP, the new S-expression is (+A (DF0)).

Figure 14:
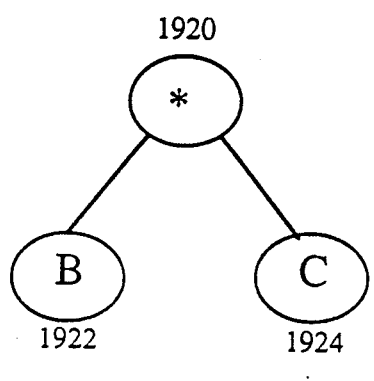
FIG. 14 illustrates the portion of the simple entity in FIG. 12 being represented by the "Define Building Block" function.

At the same time, a function DF0 is created. Its definition is shown in FIG. 14. Its definition consists of the operations shown in the tree with root 1920. In LISP, the function might be written as (DEFUN DF0 ()
  (*BC)
)

In implementing this operation on a computer, the sub-tree calling for the multiplication of B and C is first defined and may then be compiled during the execution of the overall run. The LISP programming language facilitates the compilation of functions during the execution of an overall run.

The effect of this replacement is that the selected sub-tree is no longer subject to the potentially disruptive effects of crossover because it is now an individual single point. The newly defined function is now indivisible, although, in a different implementation of the "define building block" operator, it is possible that they might be susceptible to other genetic operators. The newly defined function is a potential "building block" for future generations and may proliferate in the population based on fitness. The "define building block" operation appears to improve performance of the overall process significantly.

The editing operation provides a means to edit S-expressions as the process is running. The editing operation may be applied after the new population is created through the action of the other operations. It may be controlled by a frequency parameter which specifies whether it is applied on every generation or merely a certain subset of the generations. The editing operation is an asexual operation in that it operates on only one parental S-expression. The result of this operation is one offspring S-expression. The editing operation, if it is used at all, is typically applied to every individual S-expression in the population.

The editing operation recursively applies a pre-established set of editing rules to each S-expression in the population. First, in all problem domains, if any sub-expression has only constant atoms as arguments, the editing operation will evaluate that sub-expression and replace it with the value obtained. In addition, the editing operation applies particular sets of rules that apply to various problem domains, including rules for numeric domains, rules for Boolean domains, etc. In numeric problem domains, for example, the set of editing rules would typically include a rule that inserts zero whenever a sub-expression is subtracted from an identical sub-expression and a rule that inserts a zero whenever a sub-expression is multiplied by zero. In addition, in a numeric problem domain, an editing rule may be included whereby the expression (* X 1) would be replaced with X. In Boolean problem domains, the set of editing rules typically would include a rule that inserts X in place of (AND X X), (OR X X), or (NOT (NOT X)).

Editing primarily serves to simplify S-expressions. It also typically improves performance by reducing the vulnerability of an S-expression to disruption due to crossover at points within a potentially collapsible, non-parsimonious, but useful sub-expression. Crossover at such points typically leads to counter-productive results. For example, if an example an S-expression contains a sub-expression such as (NOT (NOT X)), which is susceptible to editing down to a more parsimonious sub-expression (i.e. X), a crossover in the middle of this sub-expression would produce exactly the opposite Boolean result. The editing operation prevents that kind of crossover from occurring by condensing the sub-expression.

Note that, for each operation described above, the original parent S-expression is unchanged by the operation. The original unaltered parental S-expression may participate in additional genetic operations during the current generation, including replication (fitness proportionate reproduction), crossover (recombination), mutation, permutation, editing, or the "define building block" operation.

Finally, the results of the chosen operation are added to the population. When new individual computational procedures are created by any operation, they are added to the existing population of individuals. The process of executing the new computational procedures to produce a result and then assigning a value to the results can be immediately performed. Thus, if the next step terminates the iterative process, the newly created computational procedures will have a fitness value.

In nature, the activation of individuals, their selection based on fitness, their reproduction, and mating does not occur in a highly orderly and sequential way. Rather, the process is tumultuous in that the two individuals from one evolving population may mate at one time step and then, other individuals from other populations may mate immediately thereafter. That is, it is not the case that 100% of the individuals in one designated evolving population are sequentially paired off for mating in an ordered, sequential way, and then, 100% of the individuals in another population are sequentially processed in a similar way.

Similarly, in the present invention, it is not necessary that the processing be conducted in a totally ordered, sequential manner. The present invention involves designating, at a particular time, one population as the evolving population. Then, at least one entity from that evolving population is activated and its fitness value assigned. Then, an operation is chosen. If that operation is reproduction, then one entity is reproduced. If that operation is crossover, that one individual and at least one additional individual engage in crossover. If, for example, tournament selection is used as the method for selection, there is no need to activate 100% of the individuals in the designated evolving population in order to select the individuals. Instead, as few as two individuals need be activated from the current designated evolving population. Then, another population may be designated as the current evolving population. Depending on the operation chosen, as few as one or two individuals from that current evolving population may be involved in some operation. Thus, the process of the present invention can operate in the same "tumultuous" fashion as natural processes.

Parallel Processing

The process of the present invention can benefit greatly from parallel operation. By using parallel processing, the overall rate of activity rises in almost direct proportion to the number of activities performed simultaneously. This is beneficial since it can reduce the overall run time of the genetic algorithm and thereby make the solution of hard problems tractable.

The present invention can benefit from parallel operation in several ways that apply equally to conventional genetic algorithms involving fixed length character strings and non-linear genetic processes involving hierarchical structures that can vary in size and shape.

First, for example, each of the genetic operations (crossover, reproduction, etc.) can be simultaneously performed in parallel on different entities in the population. If the entities are computer programs, parallel processing is accomplished by a computing machine having multiple operating units (control and arithmetic) capable of simultaneously working on entities from the population. In this case, the overall rate of activity rises in almost direct proportion to the number of activities (i.e. genetic operations) performed simultaneously in parallel.

Secondly, the determination of the fitness of a given individual in the population is often, by far, the most resource intensive part of the operation of the process. If the entities are computer programs, the calculation of fitness often consumes the most computer time. When this is the case, the determination of fitness for each individual can be performed simultaneously in parallel for every entity in the populations. In this instance, the overall rate of activity rises in almost direct proportion to the number of activities (i.e. time-consuming fitness calculations) performed simultaneously in parallel.

Thirdly, the entire process can be performed simultaneously in parallel. Since the process has random steps, it is possible that different solutions can emerge from different runs. These different solutions can be compared and the best one adopted as the solution to the problem. In this case, the overall rate of activity rises in almost direct proportion to the number of activities (i.e. entire runs) performed simultaneously in parallel.

The co-evolution process of the present invention lends itself to a fourth kind of simultaneously parallel operation. In the determination of the fitness of an individual in the population, each individual in the evolving population is tested against each individual in the current environmental populations (or, at least, a sampling of individuals from at least one of the environmental populations). If the entities are computer programs, parallel processing is accomplished by a computing machine which computes the fitness of the individual. This determination of fitness can be executed simultaneously in parallel for various individuals from the evolving population. In this case, the overall rate of activity rises in almost direct proportion to the number of activities (i.e. individual fitness calculations) performed simultaneously in parallel.

In addition, pipeline parallelism can be used. That is, each of the major steps of the process can be performed by different processors. A given individual can be passed down the pipeline so that each step of the process is performed by a different processor for that particular individual.

It should be noted that if there are two populations and each individual from the evolving population is tested against each individual in the current environmental population, it is possible to retain the result of that interaction in a memory (such as a table in the memory of a computer). Then, after the determination of fitness is completed for the entire evolving population, it is not necessary, when determining the fitness of the environmental population, to again test each individual in the environmental population against each individual in the original evolving population. The results of those interactions are already in the memory (i.e. a table in memory). The results of these interactions could equally be stored in any storage medium such as Random Access Memory (RAM), magnetic disk or tape. Similarly a table need not be used. Any data structure that maps keys into values would be appropriate. The fitness of each individual in the environmental population can then be determined by assembling the results from this memory; thus, a quick fitness calculation can be performed.

In the more general case, where the fitness of an individual from the evolving population is evaluated from its interaction with only a sampling of the environmental population, the result of any interaction that is in the memory can be used. But, if no result is already in the memory, the fitness can be computed anew in the usual manner.

In the still more general case where there are three or more populations, the evaluation of fitness of an individual from the evolving population is computed by averaging its performance as a result of its interaction with each possible combination of individuals from each of the environmental populations. For example, if there are three populations of 100 individuals, the evaluation of fitness of an individual from the evolving population is the average of its performance as a result of interacting with the 10,000 (100 times 100) possible combinations of individuals from the first and second environmental populations.

In practice, a sampling consisting of a subset of these 10,000 possible combinations may be used. However, regardless of whether or not sampling is used, the result of any interaction between any combination of three individuals (one from the evolving population, one from the first environmental population, and one from the second environmental population) can be stored in the memory (i.e. table in memory). Then, whenever the fitness associated with that combination of three individuals may again be required in any subsequent calculation, the value can be taken from the memory instead of performing the actual computation of fitness.

Since the computation of fitness is typically the most onerous part of the entire process in terms of resources used (i.e. computer time on a computer), considerable savings can be achieved through use of this memory.

Illustration of Co-evolution with Games

Co-evolution can be applied to solving competitive problems. The existing theory of games has terminology and concepts that are useful to us here in illustrating the idea of the "co-evolution process."

In a game, there are two or more independently-acting players who make choices (moves) and receive a payoff based on the choices they make. The most familiar type of game is the "2-person" "competitive" "zero-sum" game. In this type of game, there are two competing players. The payoff to one player is exactly complementary to the payoff of the other player (and therefore sums to zero). Checkers, chess, and tic-tac-toe are zero-sum games because the payoff to one player (either winning or losing) is complementary to the payoff of the other player. In some games, the payoff is measured in terms of a range of quantitative values (money, score, points, time, etc.) rather than merely two qualitative possibilities (winning or losing). Poker is a game where the payoff is measured in terms of a range of quantitative values (i.e. money). Also, poker is an example of a zero-sum game because the losses of the losing player(s) exactly equals the winnings of the winning player.

In some games, the players may be semi-cooperative or cooperative; however, the point is that the players are independent agents which act independently in accordance with their own internal drives. Also, in some games, the players move sequentially (often by alternating turns as in checkers or chess). In other games, the players move simultaneously (e.g. real time pursuit games).

In some games, the players know the entire state of the game (i.e. the board, playing field, etc.) at the time they make their move. Checkers, chess, and tic-tac-toe are such games (in contrast to poker where the player does not know everything about the other player's position at the time he moves).

In order to illustrate the processes of the present invention, the following sections describe the operation of the co-evolutionary process with two games: 1) a simple discrete game with 32 payoff points, and 2) a simple game of pursuit. Both involve two populations (two players).

Simple Discrete Game with 32 Payoff Points

We now illustrate the "hierarchical co-evolution process" to discover optimal strategies for both players simultaneously in a simple discrete game represented by a game tree in extensive form.

In the hierarchical co-evolution process, we do not have access to the optimal opponent to train the population. Instead, our objective is to breed two populations simultaneously. Both populations start as random hierarchical compositions of the available functions and arguments. These compositions are of various sizes and shapes. The entire second population serves as the "environment" (environmental population) for testing the performance of each particular individual in the first population. And, at the same time, the entire first population serves as the environment for testing the performance of each particular individual in the second population. The process does not have access to the "absolute fitness" measure provided by an optimal opponent. In other words, only relative fitness need be used to drive the co-evolution process.

Figure 8:
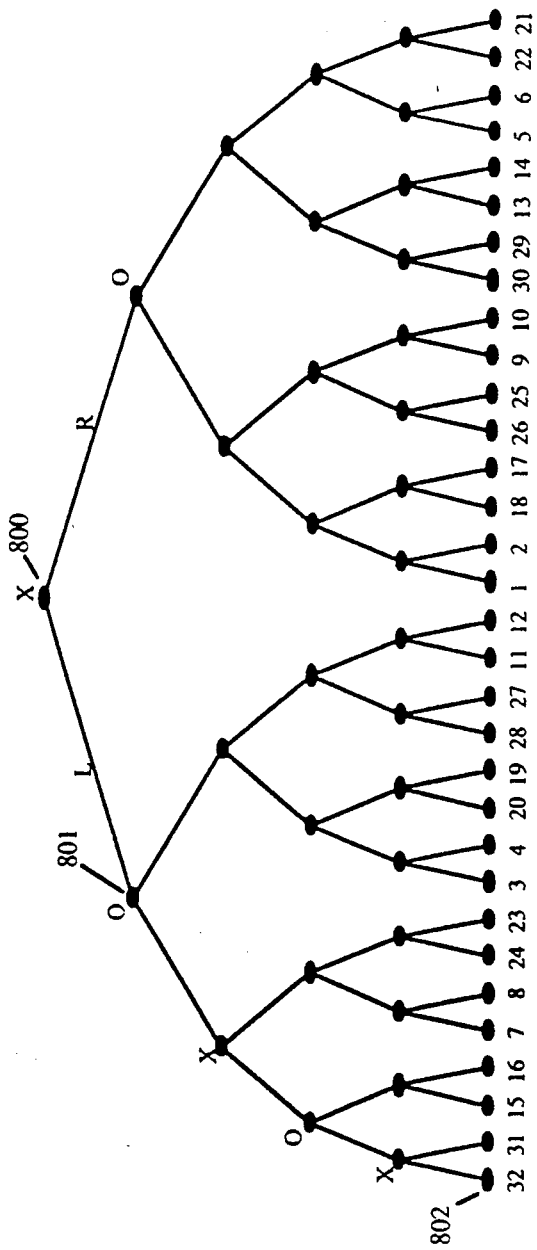
FIG. 8 illustrates a game tree with payoff points.

Consider the following simple discrete game whose game tree is presented in extensive form in FIG. 8. Internal points of this tree correspond to the player who must move. Lines extending down from internal points correspond to the choice (either L or R) made by the moving player. Endpoints of the tree correspond to the payoff (to player X).

This game is a two-person, competitive, zero-sum game in which the players make alternating moves. On each move, a player can choose to go L (left) or R (right). After player X has made three moves and player O has made two moves, player X receives (and player O pays out) the payoff shown at the particular endpoint of the game tree (1 of 32 points).

Referring to FIG. 8 for an example of the game, the internal point 800 corresponds to the X player's first turn to move. If X chooses to move left (L), the tree is traversed to point 801 where player O now has a chance to move. If, for example, each player consistently chose to move left, the tree would be traversed to point 802 where player X would receive a payoff of 32.

Since this game is a game of complete information, each player has access to complete information about his opponent's previous moves (and his own previous moves). This historical information is contained in five variables XM1 (X's move 1), OM1 (O's move 1), XM2 (X's move 2), OM2 (O's move 2), and XM3 (X's move 3). These five variables each assume one of three possible values: L (left), R (right), or U (undefined). A variable is undefined prior to the time when the move to which it refers has been made. Thus, at the beginning of the game, all five variables are undefined. The particular variables that are defined and undefined indicate the point to which play has progressed during the play of the game. For example, if both players have moved once, XM1 and OM1 are defined (as either L or R) but the other three variables (XM2, OM2, and XM3) are undefined (have the value U).

A strategy for a particular player in a game specifies which choice that player is to make for every possible situation that may arise for that player. In particular, in this game, a strategy for player X must specify his first move if he happens to be at the beginning of the game. A strategy for player X must also specify his second move if player O has already made one move and it must specify his third move if player O has already made two moves. Since Player X moves first, player X's first move is not conditioned on any previous move. But, player X's second move will depend on Player O's first move (i.e. OM1) and, in general, it will also depend on his own first move (XM1). Similarly, player X's third move will depend on player O's first two moves and, in general, his own first two moves. Similarly, a strategy for player O must specify what choice player O is to make for every possible situation that may arise for player O. A strategy here is a computer program (i.e. LISP S-expression) whose inputs are the relevant historical variables and whose output is a move (L or R) for the player involved. Thus, the set of terminals (i.e. potential leaves for program trees) consists of two atoms. That is, T={L, R}.

Four testing functions CXM1, COM1, CXM2, and COM2 provide the facility to test each of the historical variables that are relevant to deciding upon a player's move. Each of these functions is a specialized form of the CASE function in LISP. For example, function CXM1 has three arguments and evaluates its first argument if XM1 (X's move 1) is undefined, evaluates its second argument if XM1 is L (Left), and evaluates its third argument if XM1 is R (Right). Functions CXM2, COM1, and COM2 are similarly defined. Thus, the function set for this problem is F={CXM1, COM1, CXM2, COM2}. Each of these functions (i.e. the potential internal points of the program trees) takes three arguments. Clearly the same process could be implemented in virtually any other programming language or descriptive system for the execution of logical and/or numerical operations. Our goal is to simultaneously co-evolve strategies for both players of this game.

In co-evolution, the relative fitness of a particular strategy for a particular player in a game is the average of the payoffs received when that strategy is played against the entire population of opposing strategies. The absolute fitness of a particular strategy for a particular player in a game is the payoff received when that strategy is played against the optimal strategy for the opponent. Note that when we compute the absolute fitness of an X strategy for our descriptive purposes here, we test the X strategy against 4 possible combinations of O moves—that is, O's choice of L or R for his moves 1 and 2. When we compute the absolute fitness of an O strategy, we test it against 8 possible combinations of X moves—that is, X's choice of L or R for his moves 1, 2, and 3. Note that this testing of 4 or 8 combinations does not occur in the computation for relative fitness. When the two optimal strategies are played against each other, the payoff is 12. This score is the value of this game. An optimal strategy takes advantage of non-optimal play by the other player.

As previously mentioned, the co-evolution process does not use the optimal strategy of the opponent in any way. We use it in this disclosure for descriptive purposes. The co-evolution process uses only relative fitness as related to the environmental populations.

In particular, in order to co-evolve strategies for playing the discrete game with 32 outcomes, we simultaneously breed a population of 300 strategies for player X and a population of 300 strategies for player O. First we designate the X population as the evolving population and the O population as the environment population. Then we activate individual number 1 of the evolving (X) population and play it against all 300 individuals of the environment (O) population (or, at least a good sampling of the environment population). The simplest and most orderly way to proceed on a serial computer is to repeat this process in a sequential manner for individuals number 2 through 300 of the evolving (X) population. There would thus be 90,000 interactions.

Then, we might switch designations and designate the O population as the evolving population and the X population as the environment population. We would then compute the fitness of individual number 1 of the O population by playing it against all 300 individuals of the X population. Then, we would repeat this process for individuals number 2 through 300 of the O population.

As noted elsewhere, we have saved the results of the 90,000 separate interactions involved in our original evaluation of the X population as it was played against the O population. We could save computational effort by obtaining the results for the interaction of the O population as the evolving population by merely referring to our table in memory (cache) of results.

This process need not be carried out in the obvious and orderly way described above. The designating of one population as the evolving population and the other population as the environment population can, for example, be performed anew after each occasion where an individual (or group of individuals) participates in a genetic operation (e.g. reproduction, crossover, etc.).

Note, therefore, that the designation of one population as the evolving population and the remainder of the plurality of populations as the environment populations is merely a convenience for conceptualization, since in practice each one is, at some time, going to be the evolving population and each one is going to perform the role of being an environment population. Thus, in nature, all populations are simultaneously both evolving and environment populations. It is simply convenient on a serial computer to use this iterative designation.

In one run (with population size 300), the individual strategy for player X in the initial random generation (generation 0) with the best relative fitness was (COM1 L (COM2 (CXM1 (CXM2 R (CXM2 R R R) (CXM2 R L R)) L (CXM2 L R (COM2 R R R))) (COM1 R (COM2 (CXM2 L R L) (COM2 R L L) R) (COM2 (COM1 R R L) (CXM1 R L R) (CXM1 R L L))) (CXM1 (COM2 (CXM1 R L L) (CXM2 R R L) R) R (COM2 L R (CXM1 L L L)))) R).

This is a non-parsimoneous expression for $X_i$ strategy and contains numerous redundancies and inaccessible paths. By removing these redundancies, it can be simplified to the expression:

(COM1 L (COM2 L L R) R).

This individual has relative fitness of 10.08. The individual in the initial random population (generation 0) for player O with the best relative fitness was an equally complex expression. It simplifies to (CXM2 R (CXM1 # L R) (CXM1 # R L)).

Note that, in simplifying this strategy, we inserted the symbol # to indicate that the situation involved can never arise (i.e. these are inaccessible paths in the program). This individual has relative fitness of 7.57.

Neither the best X individual nor the best O individual from generation O reached maximal absolute fitness.

Note that the values of relative fitness for the relative best X individual and the relative best O individual from generation 0 (i.e. 10.08 and the 7.57) are each computed by averaging the payoff from the interaction of the individual involved with all 300 individual strategies in the current environmental population.

In generation 1, the individual strategy for player X with the best relative fitness had relative fitness of 11.28. This individual X strategy is still not an optimal strategy. It does not have the maximal absolute fitness. In generation 1, the best individual O strategy attained relative fitness of 7.18. It is shown below:

(CXM2 (CXM1 R R L) (CXM2 L L (CXM2 R L R)) R).

This individual O strategy simplifies to (CXM2 (CXM1 # R L) L R).

Although the co-evolution process does not know it, this best single individual O strategy for generation 1 is an optimal strategy for player O. This one O individual was the first such O individual to attain this level of performance during this run. If it were played against the optimal X strategy, it would score 12 (i.e. the value of this game).

Between generations 2 and 14, the number of individuals in the O population reaching maximal absolute fitness was 2, 7, 17, 28, 35, 40, 50, 64, 73, 83, 93, 98, and 107, respectively. That is, the optimal O strategy began to dominate the O population.

In generation 14, the individual strategy for player X with the best relative fitness had relative fitness of 18.11. Although the co-evolution process does not know it, this one individual scored maximal absolute fitness. This one X individual was the first such X individual to attain this level of performance during this run. If it were played against the optimal O strategy, it would score 12 (i.e. the value of this game). This individual was (COM2 (COM1 L L (CXM1 R R R)) L (CXM1 (COM1 L L (CXM1 R R R)) (CXM2 L R R) R)).

This individual X strategy simplifies to (COM2 (COM1 L L R) L R).

Between generations 15 and 29, the number of individuals in the X population reaching maximal absolute fitness was 3, 4, 8, 11, 10, 9, 13, 21, 24, 29, 43, 32, 52, 48, and 50, respectively. That is, the optimal X strategy began to dominate the X population. Meanwhile, the O population became even more dominated by the O optimal strategy.

By generation 38, the number of O individuals in the population reaching maximal absolute fitness reached 188 (almost two thirds of the population) and the number of X individuals reaching maximal absolute fitness reached 74 (about a quarter). That is, by generation 38, the optimal strategies for both players were dominant.

Interestingly, these 74 X individuals had relative fitness of 19.11 and these 188 O individuals had relative fitness of 10.47. Neither of these values equals 12. The relative fitness is derived by averaging the results of playing each X individual with each O individual. This, because the other population is not fully coverged to its optimal strategy; this strategy is, on the average, able to score more than 12.

In summary, we have seen the discovery, via mutual bootstrapping, of the optimal strategies for both players in this game. This mutual bootstrapping process found the optimal strategies for both players without using knowledge of the optimal strategy (i.e. any a priori knowledge of the game) for either player.

The two strategies that were genetically bred above for player X and player O for this particular game were both "pure strategies." That is, each player should execute the strategy each time he played the game.

However, for many games, the optimum strategy for a player requires randomly and unpredictably switching between pure strategies, with each pure strategy being selected a certain fraction of the time. The hierarchical co-evolution process described herein provides a means to generate such "mixed strategies." In particular, the entire population, at a given time, can be viewed as a collection of pure strategies. When a given player must play the game, he selects one of the individual strategies in this population of strategies at random and then plays that strategy. Thus, if a population of 100 individual strategies has converged so that 50 of the 100 individuals are identical, then the player will have a 50% chance of playing that particular strategy on his next play of the game. That is, that particular strategy will appear with frequency of 50% in that player's mix of strategies for playing the game.

It should be recognized that both players in the co-evolutionary process play the game in relation to an overall global "environment" that also helps determine their payoff. This is analogous to the situation in nature where competing populations of biological organisms compete with one another while, at the same time, they operate inside an overall physical global environment (which is typically relatively unchanging over relatively short periods of time). This overall global environment plays an important role in determining the overall success (fitness, payoff) of each organism. The 32 particular payoff values at the 32 endpoints of the game tree are reflective of the over-riding, controlling role of the overall global environment.

It is important to note that it is the presence of imperfect individuals in one population that drives the opposing population towards its optimal strategy. Simple strategies exist that can deliver the values of the game when played against an optimal player, i.e. (COM1 L R R) for the X player and R for the O player. These strategies, however only work properly against optimal players. The presence of players in each population that are not "good enough" to make the best moves requires the players of each population to be able to take advantage of these bad moves in order to achieve high relative fitness. Thus, optimal strategies evolve without reference to any externally provided optimal players.

A Simple Game of Pursuit

A simple game of pursuit is a "2-person" "competitive" "zero-sum" "simultaneous moving" "complete information" game in which a pursuing player P is trying to capture an evading player E. The "choices" available to a player at a given moment in time consist of choosing a direction (angle) in which to travel. In the simple game of pursuit, the players travel on a Cartesian plane. Both players may instantaneously change direction without restriction (i.e. either smoothly or abruptly). Each player travels at a constant speed; but, the pursuing player's speed $w_p$ is greater than the evading player's speed $w_e$. Since this particular game involves physical motion and it is necessary to avoid using the term "move" in two different ways, the term "travel" is used to refer to the physical motion of the players on the plane. The term "choice" is used to refer to the decision that the players make at various times during the game.

The state variables of the game are the current positions in the plane of the pursuing player P and the evading player E. Thus, the state of the game consists of the four numbers $x_p$, $y_p$, $x_e$, and $y_e$ representing the coordinate positions $(x_p, y_p)$ and $(x_e, y_e)$ of the two points in the plane. Since the players can instantaneously choose a new direction without restriction, the state of the game consists of only these four numbers.

Although this game is most easily viewed as one in which both players move continuously, as would be the case if this game were being played in the real world, it is impossible to represent this "analog" behavior on a digital computer. We therefore simulate each player as it moves in small increments of time, which we call time steps, so as to give the overall impression of smooth motion.

At each time step, both players know the position of the other player. That is, the state variables are known to both players. The choice for each player is to select a value of their control variable (i.e. the angular direction in which to travel). The pursuer's control variable is the angle $\phi$ (from 0 to 360 degrees, or, equivalently from 0 to $2\pi$ radians) and the evader's control variable is the angle $\Omega$. The player's do not directly know the choice of control variable (angular direction) made by the other player; although, they can subsequently see its effect on the state variables (position).

The analysis of this game can be simplified by reducing the number of state variables from four to two. This state reduction is accomplished by simply viewing the pursuer P as being at the origin point (0,0) of a new coordinate system at all times and then viewing the evader E as being at position (x, y) in this new coordinate system. The two numbers x and y representing the position (x, y) of the evader E thus become the two "reduced" state variables of the game. Whenever the pursuer P travels in a particular direction, the coordinate system is immediately adjusted so that the pursuer is repositioned back at the origin (0,0) and then appropriately adjusting the position (x, y) of the evader to reflect the travel of the pursuer.

The state transition equations for the evader E are as follows:

$$x(t+1)=x(t)+\Delta x$$

$$y(t+1)=y(t)+\Delta y$$

When the evader E travels in direction $\Omega$, the change in its x position is $w_e \cos \Omega$ and the change in its y position is $w_e \sin \Omega$. When the pursuer P travels in direction $\phi$, the change in its x position is $w_p \cos \phi$ and the change in its y position is $w_p \sin \phi$. However, because the pursuer P is immediately repositioned back to the origin (0,0), the differences $\Delta x$ and $\Delta y$ are as follows:

$$\Delta x = w_e \cos \Omega - w_p \cos \phi$$

$$\Delta y = w_e \sin \Omega - w_p \sin \phi.$$

This simple game of pursuit is called a differential game because the presence of the differences $\Delta x$ and $\Delta y$ (which become derivatives or differentials in the limiting case when time is continuous) in the state transition equations of the game.

In order to develop optimal playing strategies for the two players, a set of random starting condition cases are used consisting of $N_e (=10)$ starting positions $(x_i, y_i)$ for the evader E. Each starting value of $x_i$, $y_i$ is between $-5.0$ and $+5.0$. (These "starting condition cases" are sometimes referred to as "environmental" "starting condition cases;" but, we avoid the use of the term "environment" in that way herein because of its special meaning when "co-evolution" is being discussed). The two players may travel anywhere in the plane.

The pursuer P is regarded as having captured the evader E when the pursuer gets to within some specified small distance $e=0.5$ of the evader E.

The payoff for a given player is measured by time. The payoff for the pursuer P is the total time it takes to capture the evader E over all of the starting condition cases. The pursuer tries to minimize this time to capture. The payoff for the evader E is the total time of survival for E summed over the starting condition cases. The evader tries to maximize this time of survival. In this particular simple game of pursuit, the pursuer's superior speed makes it possible for the pursuer to always capture the evader for any set of starting condition cases. A maximum "time out" time is established so that if the pursuer has not made the capture within that amount of time, for a given starting condition case using a particular strategy, that maximum time becomes the score for that strategy for that starting condition case.

This timeout time is not necessary in evolution in the real world because evolution of the population is not delayed materially by pathological behavior of certain members of the population. However, when operating on a (serial) computer it is convenient to have this sort of timeout so as to prevent pathological programs from trapping the genetic process in infinite loops.

The problem is (i) to find the strategy for choosing the control variable of the pursuer so as to minimize the total time to capture for any set of starting condition cases and (ii) to also find the strategy for choosing the control variable of the evader so as to maximize the total time of survival for any set of starting condition cases.

For this particular simple game, the best strategy for the pursuer P at any given time step is to chase the evader E in the direction of the straight line currently connecting the pursuer to the evader. For this particular simple pursuit game, the best strategy for the evader E is to race away from the pursuer in the direction of the straight line connecting the pursuer to the evader.

Figure 9:
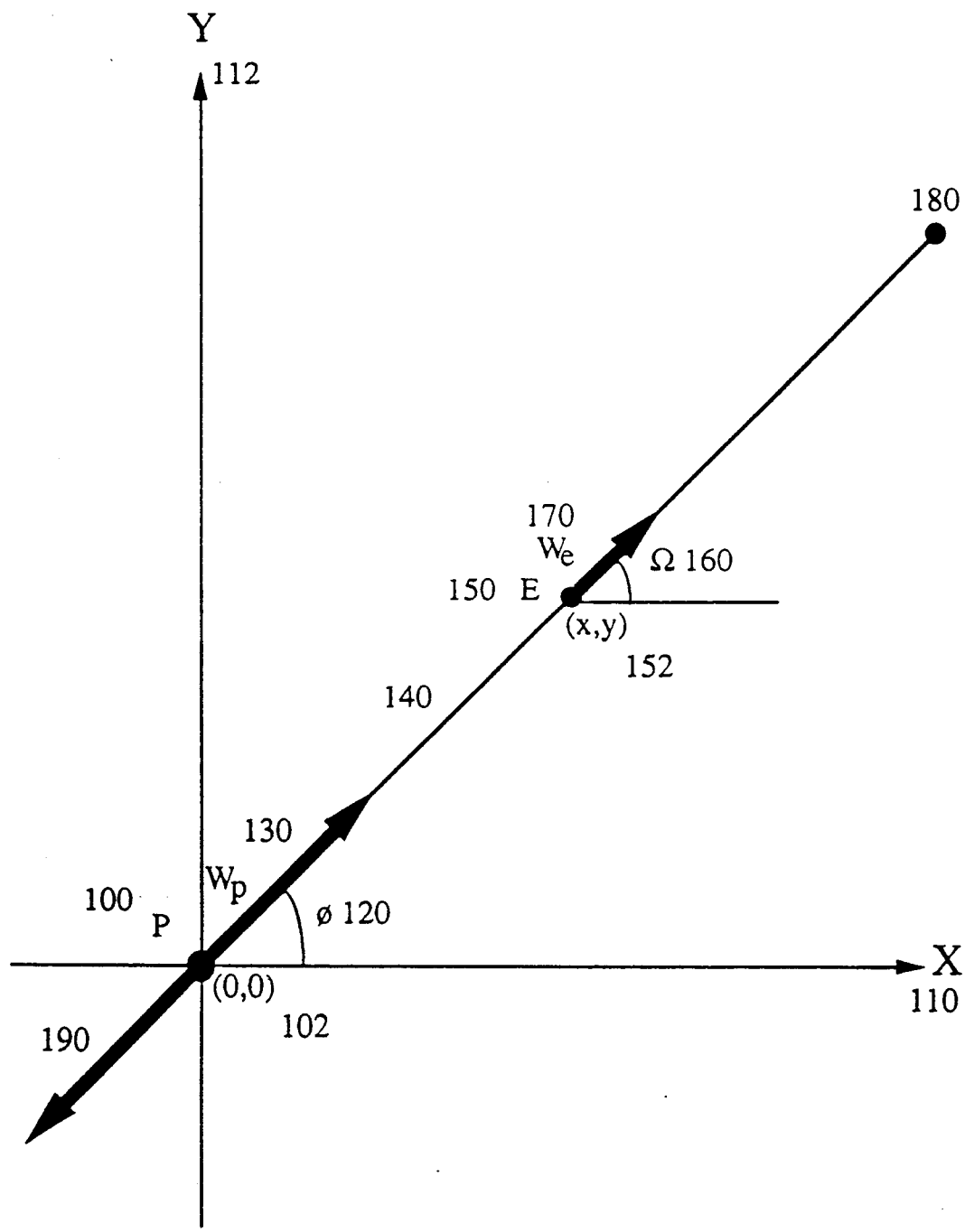
FIG. 9 illustrates the best and worst strategies in a pursuit game.

FIG. 9 shows the pursuer P 100 at the origin (0,0) 102 of a conventional coordinate system with horizontal X-axis 110 and vertical Y-axis 112. The pursuer P 100 has chosen to travel in the direction of the angle $\phi$ 120. The velocity of the pursuer is shown by the vector 130 (i.e. the directed line segment starting at P 100 and oriented at angle $\phi$ 120). The speed of the pursuer (magnitude of the vector 130) is denoted by $w_p$. The straight line 140 connects the pursuer P 100 to the evader E 150. The evader E 150 has coordinates (x,y) 152. The evader E 150 has chosen to travel in the direction of the angle $\Omega$ 160. The velocity of the evader is shown by the vector 170 (i.e. the directed line segment starting at E 150 and oriented at angle $\Omega$ 160). The speed of the evader (i.e. magnitude of the vector 170) is denoted by $w_e$. Note that the speed of the evader $w_e$ is less than the speed of the pursuer $w_p$. If both the pursuer and evader follow their best strategy, the pursuer catches the evader at the point of capture 180.

The worst strategy for the pursuer P 100 is to avoid the evader E 150 by racing away from the evader in the direction precisely opposite to the pursuer's best strategy, namely, in the direction denoted by the vector 190. The worst strategy for the evader E 150 is to race towards the pursuer P 100 along this same straight line 140.

If the evader chooses some action other than the strategy of racing away from the pursuer in the direction of the straight line connecting the pursuer to the evader, the evader will survive for less time than if he follows his best strategy.

Figure 10:
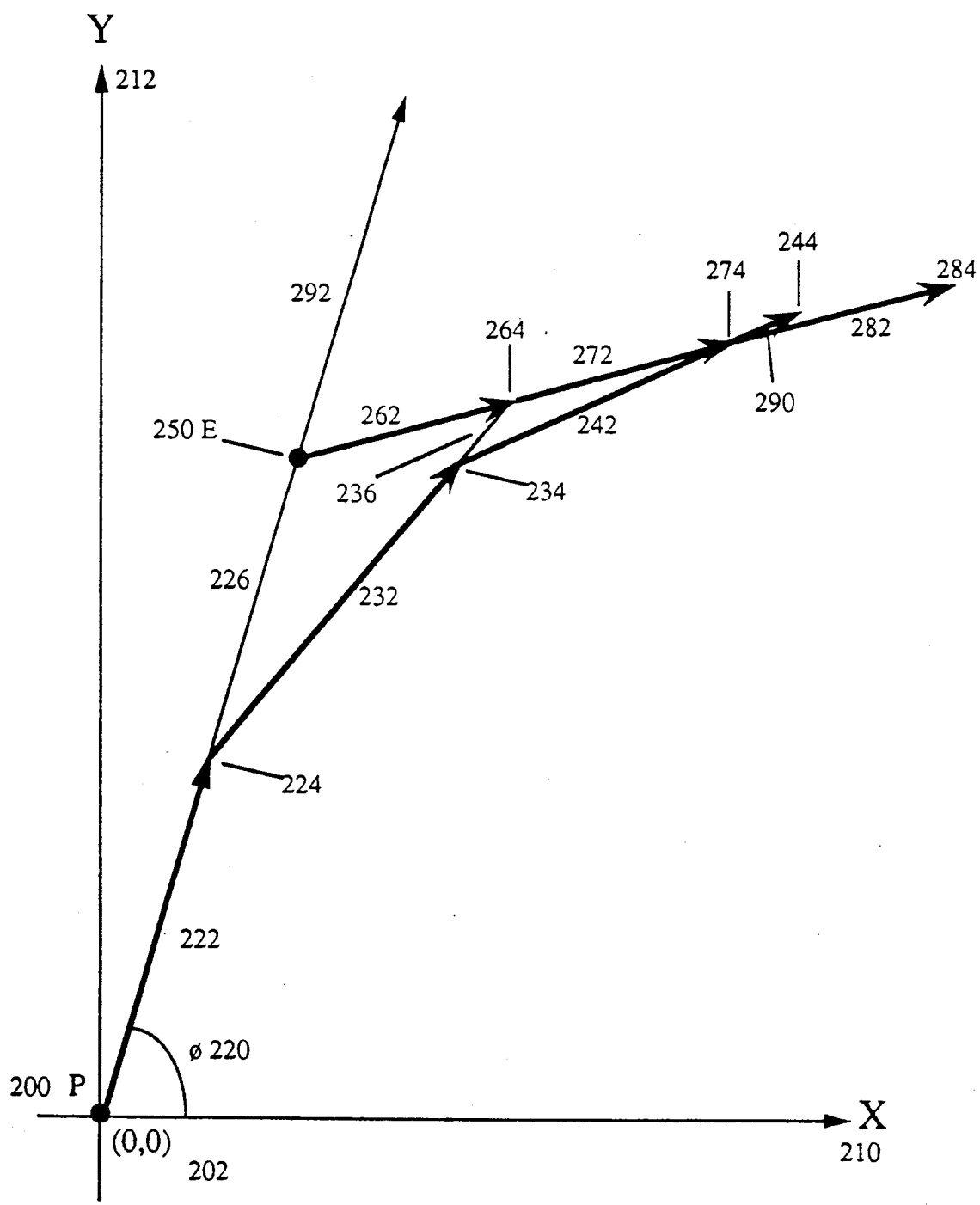
FIG. 10 illustrates a sub-optimal strategy in a pursuit game.

FIG. 10 shows the effect of the evader E moving in a direction other than the best direction. Pursuer P begins at the origin (0,0) 202 of a conventional coordinate system with horizontal X-axis 210 and vertical Y-axis 212. The pursuer P has chosen to travel in the optimal direction, namely along the vector 222 in the direction of angle $\phi$ 220. The vector 222 is in the direction of the straight line 226 connecting the current position 202 of pursuer P and the current position 250 of evader E.

After one time step, pursuer P will have advanced to point 224. Evader E has chosen to travel in a sub-optimal direction indicated by the vector 262 (which is not along the straight line 226 connecting pursuer P to evader E). After one time step, evader E had advanced to point 264.

On the second time step, pursuer P continues to travel in an optimal way, namely, along the straight line 236 connecting its current position 224 to the evader's current position 264. Thus, the pursuer P travels along vector 232. After one time step, the pursuer has advanced to point 234. Evader E continues to travel in the same sub-optimal direction as before, namely, along the vector 272. After one time step, the evader E has advanced to point 274.

On the third time step, pursuer P continues to travel in an optimal way, namely, along the straight line connecting its current position 234 to the evader's current position 274. Thus, the pursuer P travels along vector 242. After one more full time step, pursuer P would advance to position 244. Evader E continues to travel in the same sub-optimal direction as before, namely, along the vector 282. After one more full time step, evader E would advance to position 284. But, when evader E is at 290, pursuer P is within the specified distance (e) for capture. This capture occurs in less time than if E had started from 250 by moving in the optimal direction 292. Pursuer P thus travels along a curved path connecting 200, 224, 234, 274 and 244.

If the evader initially chooses a sub-optimal direction and then belatedly chooses the optimal direction, his time of survival is less than if he had chosen the optimal direction from the beginning. The situation is symmetric in that if the pursuer does not chase after the evader E along the straight line, he fails to minimize the time to capture.

The "value of the game" is the payoff (time) such that, no matter what the evader does, the evader cannot hold out for longer than this amount of time; if the evader does anything other than direct fleeing, his survival time is a shorter amount of time. Reciprocally, no matter what the pursuer does, the pursuer P cannot capture E in less than the amount of time equal to the "value of the game"; if the pursuer does anything other than direct pursuit, the evader can remain at large for a longer amount of time.

The Game Of Simple Pursuit

The co-evolution process can be used to solve the differential game of simple pursuit by genetically evolving a population of pursuing individuals over a number of generations if one is willing to provide an environment that consists of an optimal evader. In other words, each individual in the population of pursuing individuals would be tested against the optimal evader so that the population of pursuing individuals could improve based on this testing (i.e. absolute fitness). Similarly, an optimal evader can be genetically evolved out of a population of evading individuals if the environment consists of an optimal pursuer.

The "non-linear" form of the "genetic process" can be used to accomplish this. The "non-linear genetic process" is especially well suited to solving this kind of problem; because, the solution takes the form of a mathematical expression whose size and shape may not be known in advance and which may dynamically vary during the process. In the string-based, linear "genetic algorithm," advance knowledge of the size and shape of the final solution is necessary to develop the representation (coding) scheme.

Identification of the terminals for solving this problem using the "non-linear genetic process" is straightforward for this problem. The two reduced state variables are x and y. They denote the position of the evader E in the plane relative to the pursuer. Thus, the atom (terminal) set is the set {x, y}.

The function set for this problem can be a set of arithmetic and mathematical operations such as addition, subtraction, multiplication, division (using the operation % which returns a zero when division by zero is attempted), and the exponential function EXP. Thus, the function set is {+, −, *, %, EXP}. Addition, subtraction, multiplication, and division take two arguments, while the EXP function takes one argument.

If the population of individuals represents pursuers and we are attempting to genetically breed an optimal pursuing individual, the environment for this "genetic process" consists of an optimal evading individual. The optimal evader travels with the established constant evader speed $w_e$ in the angular direction specified by the Arctangent function. The Arctangent function has two arguments (the x value and the y value). The Arctangent function returns a number between 0 and $2\pi$ radians (360 degrees) representing the angle whose tangent is y/x. If x happens to be zero, the sign of y determines the value of the Arctangent function. In particular, the Arctangent function returns $\pi/2$ radians (90 degrees) if the sign of y is positive and it returns $3\pi/2$ radians (270 degrees) if the sign of y is negative. The Arctangent function returns 0 in the event that both x and y are zero.

A set of random "starting condition cases" is used consisting of $N_e$ (=10) starting positions $(x_i, y_i)$ for the evader E. Each starting value of $x_i, y_i$ is a random number between −5.0 and +5.0.

The "non-linear genetic process" begins with an initial random population of mathematical expressions composed of the functions in the function set and the atoms in the atom set. Then, each individual in this initial random pursuing population is tested against the environment consisting of the optimal evader. This testing is performed with the $N_e$ (=10) starting condition cases for each pursuing individual in the pursuing population. Most individuals in the initial random population would be highly unfit if they were ever tested against the optimal evader. However, some are slightly better than others. The operations of fitness proportionate reproduction and crossover (where at least one parent is selected proportionate to fitness) are applied to produce a new population of pursuing individuals as described earlier.

As the operation of the "non-linear genetic process" progresses from generation to generation, the population of pursuing individuals typically improves. After several generations, the best pursuing individuals in the population can capture the evader in a small fraction (perhaps 2, 3, or 4) of the 10 starting condition cases within a certain pre-set time-out time. After additional generations, the population improves and the best pursuing individuals in the population can capture the evader in a larger fraction (perhaps 4, 5, or 6) of the 10 starting condition cases within a shorter amount of time. Often, these partially effective pursuers are effective in some identifiable fraction of the plane or at some identifiable range of distances, but ineffective in other parts of the plane or at other distances. However, as more and more generations are run, the population of pursuing individuals typically continues to improve.

The "non-linear genetic process" is successful in genetically breeding optimal pursuing individuals. In one run, a pursuer strategy emerged in the 17th generation which correctly handled all 10 of the starting condition cases. The LISP S-expression for this strategy is shown below:

(%(−(%(+(*2.0Y)−0.066)−0.365) (% Y−0.124))
(+(EXP X) Y−0.579))

This S-expression is equivalent to:

$$\frac{\frac{2Y - 0.066}{-0.365} + \frac{Y}{0.124}}{e^X + Y - 0.579}.$$

which, in turn, is equivalent to:

$$\frac{2.57Y + 1.81}{e^X + Y - 0.579}$$

When this apparently optimal pursuing individual is retested against a much larger set of environmental cases (i.e. 1000), we then find that it also successfully handles 100% of the environmental cases. Thus, this S-expression is an optimal solution to the problem. It is also, as a result, an excellent approximation to the Arctangent function.

An optimal evader has been similarly evolved using an optimal pursuer (i.e. the Arctangent strategy).

Note also that the above apparent optimal solution is dependent on the particular values of the parameters of this problem (such as $W_e$ and $W_p$). Slightly different pursuing individuals might emerge if other possible values of these parameters had been used. Because we intentionally did not include the Arctangent function in the function set, and because the MacLaurin infinite series for the Arctangent function (which uses multiplication, addition, subtraction, and division) converges only for a limited domain of argument values, there may be combinations of parameters for this problem for which these above apparent optimal solutions may no longer be a solution to the problem. In particular, if the zone of capture parameter e (currently 0.5) were substantially reduced (so as to require greater accuracy at the moment of capture), the range of starting condition cases were substantially expanded (beyond the −5 to +5 range used here in each direction), or the "time out" time were substantially reduced, we might find a small fraction of randomly selected starting condition cases (out of a large number of starting condition cases) for which the above apparent optimal pursuing individuals would not be successful.

Co-Evolution With The Game Of Simple Pursuit

When we were using the "non-linear genetic process" to genetically breed populations of pursuing individuals for the game of simple pursuit, the environment was an optimal evader. Each individual in the population of pursuers was tested against this single optimal evader in order to determine its fitness (i.e. absosute fitness) in solving the problem.

In the "co-evolution" process, we do not have the optimal evader. Instead, we simultaneously try to genetically breed both a population of pursuers and a population of evaders. Both populations are initially random compositions of the available functions and arguments. The entire population of evaders serves as the "environment" for testing the performance of each individual in the population of pursuers. At the same time, the entire population of pursuers serves as the environment for testing the performance of each individual in the population of evaders. No individual is rated against the absolute fitness measure provided by an optimal evader or optimal pursuer. The performance is measured solely by the aggregate amount of time to capture. If no capture occurs, the assigned maximum amount of time (i.e. the time-out time) is used. The individual being tested is pitted against the entire opposing population (or, at least a good sampling of it). In other words, only relative fitness is necessary to the "co-evolution" process. The atom set and function set for the "co-evolution" process is the same as for the "non-linear genetic process."

As before, the co-evolution algorithm is successful in breeding populations that consist substantially of individuals that are equivalent to the optimal pursuer and evader strategies (i.e. the Arctangent strategy).

The specific arrangements and methods herein are merely illustrative of the principles of this invention. Numerous modifications in form and detail may be made by those skilled in the art without departing from the true spirit and scope of the invention.

Although this invention has been shown in relation to a particular embodiment, it should not be considered so limited. Rather it is limited only by the appended claims.

What is claimed is:

1. In a parallel processing computer system having at least one processor, a memory, and a plurality of populations of programs of various sizes and structures and wherein more than one program can be executed simultaneously, a group of parallel processes for problem solving wherein more than one parallel process of said group of parallel processes can be performed simultaneously, each parallel process of said group of parallel processes comprising the steps of:
   (i) designating one of said plurality of populations as the evolving population wherein the remaining populations of said plurality of populations are designated co-evolving environmental populations;
   (ii) iterating a series of steps, said series of steps including:
      a) assigning a fitness value to a program of said evolving population and associating said fitness value with a corresponding program, said fitness value indicative of the relative fitness of said corresponding program in relation to said co-evolving environmental populations;
      b) selecting at least one program from said evolving population using selection criteria, said selection criteria based on said fitness value associated with each said program, said selection criteria preferring each said program having a relatively high associated fitness value over each said program having a relatively low associated fitness value;
      c) choosing and performing an operation, wherein said chosen operation is one of the operations of crossover or reproduction;
      d) creating, if said operation is crossover, at least one new program by crossover using a group of programs from said evolving population, said group of programs comprising said selected program and at least one other program from said evolving population, such that any new program created by crossover comprises at least a portion of said selected program and at least a portion of said other program, said new program capable of differing in size and structure from said selected program and said other program;
      e) reproducing, if said chosen operation is reproduction, said selected program in said evolving population, such that said selected program remains unchanged; and
      f) adding said new program to said evolving population; and
   (iii) terminating when a solution is found.

2. The process as claimed in claim 1 wherein said step of choosing and performing an operation further comprising the operation of mutation which occurs before said adding step, wherein said selected program is mutated, such that at least one portion of said selected program is replaced by a randomly generated portion to produce a new program having portions of said selected program and randomly generated portions.

3. The process as claimed in claim 1 wherein said step of choosing and performing an operation includes performing one of said operations for each of said parallel processes and all said parallel processes operate on said evolving population.

4. The process as claimed in claim 1 wherein each of said parallel processes operate on a separate sub-population of said evolving population, said process including a step of periodically intermixing sub-populations of said evolving population.

5. The process as claimed in claim 1 wherein said step of choosing and performing an operation includes performing one of said operations for each of said parallel processes and each of said parallel processes operate on a separate sub-population of said evolving population.

6. The process as claimed in claim 1 wherein said fitness value for said program of said evolving population is assigned relative to a combination of one program from each of a plurality of co-evolving environmental populations.

7. The process as claimed in claim 1 wherein said step of choosing and performing an operation further comprising the operation of permutation, such that if said chosen operation is permutation, a step of permutation occurs before said adding step, wherein said selected program is permuted, such that portions of each said selected program are recordered to create at least one new program from said selected program.

8. The process as claimed in claim 1 wherein said step of selecting at least one program further comprises selection criteria based on a probability that is proportional to said value associated with said program.

9. The process as claimed in claim 1 wherein said step of selecting at least one program further comprises selection criteria based on choosing the better of two randomly selected individual programs.

10. The process as claimed in claim 1 wherein initial populations of programs are created by randomly generating programs of various size and structures, said programs consisting of hierarchical programming structures, said hierarchical programming structures consisting of the functions and arguments available for the problem.

11. A computer system for problem solving comprising:
   memory means for storing a plurality of populations of programs of various sizes and structures, each said program being a hierarchical arrangement of functions and arguments;

processing means coupled to said memory means for retrieving said programs stored in said memory means, said processing means executing instructions determined by said retrieved programs;

means for designating one of said plurality of populations as the evolving population wherein the remaining populations of said plurality of populations are designated as co-evolving environmental populations;

means for assigning a fitness value to a program of said evolving population and associating said fitness value with a corresponding program, said fitness value indicative of the relative fitness of said corresponding program in relation to said co-evolving environmental populations;

means for selecting at least one program from said evolving population using selection criteria, said selection criteria based on said fitness value associated with each said program, said selection criteria preferring each said program having a relatively high associated fitness value over each said program having a relatively low associated fitness value;

means for choosing and performing an operation, wherein said chosen operation is one of the operations of crossover or reproduction;

means for creating, if said operation is crossover, at least one new program by crossover using a group of programs from said evolving population, said group of programs comprising said selected program and at least one other program from said evolving population, such that any new program created by crossover comprises at least a portion of said selected program and at least a portion of said other program, said new program capable of differing in size and structure from said selected program and said other program;

means for reproducing, if said chosen operation is reproduction, said selected program in said evolving population, such that said selected program remains unchanged;

means for adding said new program to said evolving population; and means for terminating when a solution is found.

12. The computer system as claimed in claim 11, wherein said means for selecting at least one program from said evolving population using selection criteria further comprising selection criteria based on a probability that is proportional to said fitness value associated with said program.

13. The computer system as claimed in claim 11 wherein said means for choosing and performing an operation further comprising the operation of mutation such that if said chosen operation is mutation, said selected program is mutated, such that at least one portion of said selected program is replaced by a randomly generated portion to produce a new program having portions of said selected program and randomly generated portions.

14. The computer system as claimed in claim 11 wherein said means for selecting further comprises means for removing at least one program having a relatively low associated fitness value when selecting a program having a relatively high associated fitness value.

15. The computer system as claimed in claim 11 wherein said memory means is used to store the status of all selected and removed programs.

16. The computer system as claimed in claim 11 further comprising a plurality of said processing means for performing parallel operations on said plurality of populations of programs.

17. The computer system as claimed in claim 11 wherein said means for choosing and performing an operation further comprising the operation of permutation, such that if said chosen operation is permutation, said selected program is permuted, such that portions of each said selected program are reordered to create at least one new program from said selected program.

18. The computer system as claimed in claim 11 wherein said means for assigning a fitness value assigns a fitness value indicative of the relative fitness of a program in opposing said co-evolving environmental populations.

19. The computer system as claimed in claim 11 wherein said means for assigning a fitness value assigns a fitness value for a program of said evolving population relative to a combination of one program from each of a plurality of co-evolving environmental populations.

20. The computer system as claimed in claim 11 wherein said plurality of populations of programs stored in said memory means is initially created using means for randomly generating programs of various sizes and structures, said means for randomly generating programs coupled to said processing means, said programs consisting of heierarchical arrangements of the functions and arguments available for the problem.

21. In a computer system having at least one processor, a memory, and a plurality of populations of programs of various sizes and structures, a process for problem solving comprising the steps of:

(i) designating one of said plurality of populations as the evolving population wherein the remaining populations of said plurality of populations are designated co-evolving environmental populations;

(ii) iterating a series of steps, said series of steps including:

a) assigning a fitness value to a program of said evolving population and associating said fitness value with a corresponding program, said fitness value indicative of the relative fitness of said corresponding program in relation to said co-evolving environmental populations;

b) selecting at least one program from said evolving population using selection criteria, said selection criteria based on said fitness value associated with each said program, said selection criteria preferring each said program having a relatively high associated fitness value over each said program having a relatively low associated fitness value;

c) choosing and performing an operation, wherein said chosen operation is one of the operations of crossover or reproduction;

d) creating, if said operation is crossover, at least one new program by crossover using a group of programs from said evolving population, said group of programs comprising said selected program and at least one other program from said evolving population, such that any new program created by crossover comprises at least a portion of said selected program and at least a portion of said other program, said new program capable of differing in size and structure from said selected program and said other program;

e) reproducing, if said chosen operation is reproduction, said selected program in said evolving population, such that said selected program remains unchanged; and f) adding said new program to said evolving population; and (iii) terminating when a solution is found.

22. The process as claimed in claim 21 wherein said iterating a series of steps is performed simultaneously for more than one program.

23. The process in claim 21 wherein said step of assigning a fitness value comprising:

executing a program of said evolving population to produce a result by performing said hierarchical arrangement of functions in relation to at least one program from at least one co-evolving environmental population; and assigning a value to said result and associating said value with a corresponding program from said evolving population which produced said result, said value indicative of the relative fitness of said corresponding program in opposing said co-evolving environmental population, said value relative to the results produced by programs of said co-evolving environmental population.

24. The process as claimed in claim 21 wherein said fitness value for said program of said evolving population is assigned relative to a combination of one program from each of a plurality of co-evolving environmental populations.

25. The process as claimed in claim 21 wherein said step of selecting at least one selected program further comprises selection criteria based on a probability that is proportional to said value associated with said program.

26. The process as claimed in claim 21 wherein said step of selecting at least one selected program further comprises selection criteria based on choosing the better of two randomly selected individual programs.

27. The process as claimed in claim 21 wherein said operation of crossover further comprises taking sub-procedures from at least one said selected program and at least one other program to create a new program, said new program is created solely from sub-procedures of said selected program and sub-procedures of said other program, said new program capable of varying in size and structure from said selected program and said other program.

28. The process as claimed in claim 21 wherein said step of choosing and performing an operation further comprising the operation of permutation, such that if said chosen operation is permutation, a step of permutation occurs before said adding step, wherein said selected program is permuted, such that portions of each said selected program are reordered to create at least one new program from said selected program.

29. The process as claimed in claim 21 wherein said step of choosing and performing an operation further comprises the operation of mutation such that if said chosen operation is mutation, a step of mutation occurs before said adding step, wherein said selected program is mutated, such that at least one portion of said selected program is replaced by a randomly generated portion to produce a new program having portions of said selected program and randomly generated portions.

30. The process in claim 21 wherein said step of choosing and performing an operation further comprising an operation of define building block such that if said chosen operation is said define building block operation, a step of define building block occurs before said adding step, wherein a portion of said selected program is replaced by an invocation of a building block function, said building block function being defined as the hierarchical arrangement of functions and arguments originally associated with said selected portion of said selected program.

31. The process in claim 21 wherein said step of choosing and performing an operation further comprising an operation of editing such that if said chosen operation is said editing operation, a step of editing occurs before said adding step, wherein said selected program is edited, such that predetermined editing rules are applied to said selected program to produce a modified hierarchical structure of said selected program.

32. The process as claimed in claim 21 further comprising a step of removing at least one program having a relatively low associated value.

33. The process as claimed in claim 21 wherein said operation of permutation further comprises permuting a program by rearranging the sub-procedures of said program.

34. The process as claimed in claim 21 wherein said operation of permutation further comprises permuting a program by rearranging the arguments of the sub-procedures of said program.

35. The process as claimed in claim 21 wherein said operation of permutation further comprises permuting a program by rearranging the arguments of the sub-procedures of said program and the sub-procedures of said program.

36. The process as claimed in claim 21 wherein said operation of permutation further comprises permuting a program by redistributing the arguments of all the sub-procedures of said program amongst all the sub-procedures, and reordering the sub-procedures of said program.

37. The process as claimed in claim 21 wherein an individual program in said plurality of populations attaining a pre-established value of fitness with respect to solving the problem is designated as the solution to the problem.

38. The process as claimed in claim 21 wherein a set of programs from one of said plurality of populations collectively attaining a pre-established degree of fitness with respect to solving the problem is designated as the solution to the problem.

39. The process as claimed in claim 21 wherein the entirety of one said population of programs is designated as the solution to a problem and wherein each program in said designated population is equally likely to be selected as a solution to be executed for solving the problem.

40. The process as claimed in claim 21 further including steps for providing a quick fitness calculation for evaluating the fitness of a program in relation to the fitness of programs in said co-evolving environmental populations, said steps including:

storing said fitness value assigned in said assigning step, said fitness value being stored in a memory, said storing step being performed after said assigning step; and retrieving said fitness value stored in said memory, said retrieving step being performed prior to said assigning step if said memory already contains a fitness value associated with an equivalent combination of programs, said retrieving step performed instead of computing a fitness value for said program.

41. The process as claimed in claim 21 wherein the initial plurality of populations of programs are created by randomly generating programs of various sizes and structures, said programs consisting of hierarchical arrangements of the functions and arguments available for the problem.

42. The process as claimed in claim 21 wherein said populations evolve in relation to a global environment.

43. The process as claimed in claim 21 wherein more than one program is activated simultaneously.

44. The process as claimed in claim 21 wherein said assigning step is performed simultaneously for one program of said evolving population in relation to more than one program of said co-evolving environmental population.

45. The process as claimed in claim 21 wherein said assigning step is performed simultaneously for more than one program.

* * * * *